United States Patent
Rivere

(10) Patent No.: US 9,123,005 B2
(45) Date of Patent: Sep. 1, 2015

(54) METHOD AND SYSTEM TO DEFINE IMPLEMENT AND ENFORCE WORKFLOW OF A MOBILE WORKFORCE

(71) Applicant: MobiWork, LLC, Delray Beach, FL (US)

(72) Inventor: Herve Rivere, Delray Beach, FL (US)

(73) Assignee: MobiWork, LLC, Delray Beach, FL (US)

(*) Notice: Subject to any disclaimer, the term of this patent is extended or adjusted under 35 U.S.C. 154(b) by 157 days.

(21) Appl. No.: 13/649,876

(22) Filed: Oct. 11, 2012

(65) Prior Publication Data

US 2013/0090969 A1 Apr. 11, 2013

Related U.S. Application Data

(60) Provisional application No. 61/545,938, filed on Oct. 11, 2011, provisional application No. 61/545,948, filed on Oct. 11, 2011, provisional application No. 61/545,930, filed on Oct. 11, 2011, provisional application No. 61/545,957, filed on Oct. 11, 2011.

(51) Int. Cl.
*G06Q 10/00* (2012.01)
*G06Q 10/06* (2012.01)

(52) U.S. Cl.
CPC ........................................ *G06Q 10/06* (2013.01)

(58) Field of Classification Search
CPC .............................. G06Q 10/00; G06Q 10/06
USPC ........................................................ 705/7.19
See application file for complete search history.

(56) References Cited

U.S. PATENT DOCUMENTS

| | | |
|---|---|---|
| 4,009,375 A | 2/1977 | White et al. |
| 4,891,650 A | 1/1990 | Sheffer |
| 5,182,705 A | 1/1993 | Burr et al. |
| 5,458,123 A | 10/1995 | Unger |
| 5,552,772 A | 9/1996 | Janky et al. |
| 5,561,706 A | 10/1996 | Fenner |
| 5,652,570 A | 7/1997 | Lepkofker |
| 5,712,899 A | 1/1998 | Pace, II |
| 5,734,706 A | 3/1998 | Windsor et al. |
| 5,734,837 A | 3/1998 | Flores et al. |
| 5,754,857 A | 5/1998 | Gadol |
| 5,936,572 A | 8/1999 | Loomis et al. |

(Continued)

*Primary Examiner* — Romain Jeanty
(74) *Attorney, Agent, or Firm* — Robert C. Kain, Jr.

(57) ABSTRACT

The computer program manages a mobile workforce with task persons and GPS-enabled devices by using the GPS time-based location data. A database is populated with task situs location data, event time data and task person data and task person contact data. The database is coupled to the web-based processor, telecommunications network and GPS-enabled device. The system operator programs temporal (time) based rules and location-based rules unique to the task situs. Some rules are both time and location based. When the temporal or territorial rules are violated, first and second comm-events are generated by the system, for example, a text or IVR message to the task person. When associated time-and-territorial rules are violated, a third communications event arises. The time based rules may be associated or correlated with the event time for the task. The event time may be a "time of arrival." Further, rules may be for approach, entry, or on-location. Territorial rules may proximal, intermediate and distal territories. Designated persons for the comm-notice may be hierarchically related to the task person. The comm-notice may be dynamically created from a designated persona as a content provider.

21 Claims, 32 Drawing Sheets

(56) References Cited

U.S. PATENT DOCUMENTS

| | | |
|---|---|---|
| 6,098,048 A | 8/2000 | Dashefsky et al. |
| 6,154,727 A | 11/2000 | Karp et al. |
| 6,202,023 B1 | 3/2001 | Hancock et al. |
| 6,295,513 B1 | 9/2001 | Thackston |
| 6,415,284 B1 | 7/2002 | D'Souza et al. |
| 6,509,830 B1 | 1/2003 | Elliott |
| 6,553,407 B1 | 4/2003 | Ouchi |
| 6,615,184 B1 | 9/2003 | Hicks |
| 6,687,609 B2 | 2/2004 | Hsiao et al. |
| 6,731,238 B2 | 5/2004 | Johnson |
| 7,051,273 B1 | 5/2006 | Holt et al. |
| 7,102,510 B2 | 9/2006 | Boling et al. |
| 7,142,892 B2 | 11/2006 | Dennis et al. |
| 7,155,519 B2 | 12/2006 | Lo et al. |
| 7,206,568 B2 | 4/2007 | Sudit |
| 7,246,746 B2 | 7/2007 | McNamara et al. |
| 7,249,045 B2 | 7/2007 | Lauffer |
| 7,372,365 B2 | 5/2008 | Jackson |
| 7,688,185 B1 | 3/2010 | McKethan |
| 7,756,293 B2 | 7/2010 | Kuwabara et al. |
| 8,548,734 B2 | 10/2013 | Barbeau et al. |
| 8,745,634 B2 * | 6/2014 | Agarwal et al. ............... 718/106 |
| 2004/0267595 A1 | 12/2004 | Woodings et al. |
| 2005/0021428 A1 | 1/2005 | Costello |
| 2005/0202830 A1 | 9/2005 | Sudit |
| 2005/0202831 A1 | 9/2005 | Sudit |
| 2005/0202832 A1 | 9/2005 | Sudit |
| 2005/0202834 A1 | 9/2005 | Sudit |
| 2006/0022048 A1 | 2/2006 | Johnson |
| 2006/0047548 A1 | 3/2006 | Ulmer et al. |
| 2006/0055536 A1 | 3/2006 | Jackson |
| 2006/0126620 A1 | 6/2006 | Bonar et al. |
| 2006/0206370 A1 | 9/2006 | Skopal |
| 2006/0258370 A1 | 11/2006 | Sudit et al. |
| 2007/0060171 A1 | 3/2007 | Sudit et al. |
| 2007/0162537 A1 | 7/2007 | Juncker |
| 2007/0264974 A1 | 11/2007 | Frank et al. |
| 2007/0282479 A1 | 12/2007 | Shibuya et al. |
| 2007/0282722 A1 | 12/2007 | Ducolon et al. |
| 2007/0287473 A1 | 12/2007 | Dupray |
| 2008/0014964 A1 | 1/2008 | Sudit et al. |
| 2008/0052346 A1 | 2/2008 | Bassat et al. |
| 2008/0091498 A1 | 4/2008 | Chiverton et al. |
| 2008/0171559 A1 | 7/2008 | Frank et al. |
| 2010/0069035 A1 | 3/2010 | Johnson |
| 2010/0076898 A1 * | 3/2010 | Beshears et al. ............... 705/301 |
| 2012/0095925 A1 * | 4/2012 | Agarwal et al. ............... 705/301 |
| 2012/0203589 A1 * | 8/2012 | Eggena et al. ............... 705/7.15 |
| 2013/0197957 A1 * | 8/2013 | Nudd et al. ............... 705/7.14 |

* cited by examiner

FIG. 2A

Activities Today

| Title | User | Time | Work Order (WO) - Task | Customer | Action |
|---|---|---|---|---|---|
| | | | | | |
| | | | | | |

FIG. 2B

Customers

| Name | Address | Primary Contact | Actions |
|---|---|---|---|
| | | | |
| | | | |

FIG. 2C

Work Orders

| File Type | Customer | Location | Status | Date-Time | Assigned to Task Person | Confirm | Action |
|---|---|---|---|---|---|---|---|
| | | | | | | | |
| | | | | | | | |

FIG. 2D

Equipment

| Type | Ser. No. | Work Order | Customer Name | Action |
|---|---|---|---|---|
| | | | | |
| | | | | |

FIG. 2E

Work Order Reports

| Customer | |
|---|---|
| Equipment Ser. No. | |
| Creation Date From | |
| Creation Date to | |
| Report Format | fnc. Sel.: Excel, QuatroPro, Word |
| Create Report | fnc: YES |

FIG. 2F

Balance Sheet

| Customer | |
|---|---|
| fnc: create report | YES |

FIG. 2G

Tasks

| File type | ID | Status | Category | Description | Date | Action | Status |
|---|---|---|---|---|---|---|---|
| | | | | | | | |
| | | | | | | | |

FIG. 2H

Users

| Login ID | Name | Status | Action |
|---|---|---|---|
| | | | |
| | | | |

FIG. 2I

Partners

| Name | Co. Name | Ph No. | Email | Status | Action |
|------|----------|--------|-------|--------|--------|
|      |          |        |       |        |        |
|      |          |        |       |        |        |

FIG. 2J

Devices

| Make | Model | User Name | Last Update time | Action |
|------|-------|-----------|------------------|--------|
|      |       |           |                  |        |
|      |       |           |                  |        |

FIG. 2K

Products

| Id | Name | SKU# | Price | Quantity | Actions |
|----|------|------|-------|----------|---------|
|    |      |      |       |          |         |
|    |      |      |       |          |         |

FIG. 3A
Configured Table - Initial Screen (includes new notifications, new WOs, Wos)

New Notifications

| Type | ID | Date | Description | fnc: View (V) | fnc: Accept (ACC) | fnc: delete (DEL) |
|---|---|---|---|---|---|---|
| alarm | 123 | 10.10.2011 | low batty | user select | u-sel | u-sel |
| alarm | 564 | 10.10.2011 | confirm telecom | u-sel | u-sel | u-sel |
|  |  |  |  |  |  |  |

New/Unassigned Work Orders ("WO")

| ID/Title | Customer/Loc | Status | Date | Action |
|---|---|---|---|---|
| 34 (WO 034) | John Bee 900 S. Terrace Miami, FL 123A | open | 10.15.2011 | fnc: V, ACC, DEL |
| more | etc | etc |  |  |
|  |  |  |  | X-Table Fnc: pg. 2, pg. 3, etc. |

Assigned Work Orders (no. WO's)

| ID/Title | Customer/Loc | Status | Date | Assigned to | Confirm | Action |
|---|---|---|---|---|---|---|
| 34 (WO 034) | John Bee 900 S. Terrace Miami, FL 123A | open | 10.15.2011 | Dean Smith, Ph: 345-3-260 | pending (Alt: YES, NO) | fnc: V, ACC, DEL |
| more | etc | etc |  |  |  |  |
|  |  |  |  |  |  | XT-fnc: pg. 2, 3, 4 |

Activities Today

| Title | User | Time | WO/Task | Customer | Actions |
|---|---|---|---|---|---|
|  |  |  |  |  | fnc: V, ACC, DEL |
|  |  |  |  |  | XT-fnc: pg. 2, 3, 4 |

FIG. 3B

Configured Table - New Notifications

| Alarm 123 | | | |
|---|---|---|---|
| Message | data | Status | data (ack, pend, NO) |
| Acknowledge day | date data | Create date | data |
| Acknowledge who | person data | Close date | data |
| System alarm (criticality) | critical data type | Closed by who | person data |

FIG. 3C

Configured Table - Assigned Work Orders (WO) - Main Menu

| Menu Fnc: | Summary | Equip | Notes | Docs | Forms | Activity | Bills | History |
|---|---|---|---|---|---|---|---|---|
| Status | Assigned: Y, N, pending | | | | Confirm Status | | pend, not assigned | |
| Created | date data | | | | | | Misc. Fnc: Input | |
| Customer | name | | addr. | | Ph. No. | | See More Data | |
| Location | data | | addr. | | Ph. No. | | Mark Critical | |
| Assigned to | person data | | email | | ph. No. | | Ack Done | |
| Appointment | appt. data | | travel time (est) | | time-on-site (est) | | Add Data Input | |
| Est. Duration | time span data | | travel time (actual) | | time-on-site (actual) | | | |

FIG. 3D

Configured Table - Assigned Work Orders (WO) - Equipment Table

| Menu Fnc: | Summary | Equip | Notes | Docs | Forms | Activity | Bills | History |
|---|---|---|---|---|---|---|---|---|
| Equipment Type | Problem Descript. | | Resolution | | Actions | | Fnc. | |
| Data | data | | data | | | | | |

FIG. 3E

Configured Table - Assigned Work Orders (WO) - Notes Table

| Menu Fnc: | Summary | Equip | Notes | Docs | Forms | Activity | Bills | History |
|---|---|---|---|---|---|---|---|---|
| Notes | Date | | User-pull down list: Task Person, Mgr., Sys Op., etc. | | Visible by Customer | Actions | | |
| data | data | | | | YES/NO | Fnc. | | |

FIG. 3F

Configured Table - Assigned Work Orders (WO) - DocumentTable

| Menu Fnc: | Summary | Equip | Notes | Docs | Forms | Activity | Bills | History |
|---|---|---|---|---|---|---|---|---|
| User List sel | Date | Type | | Doc Name | Comment | Action - fnc. | | |
| Data | data | etc. | | | | | | |

FIG. 3G

Configured Table - Assigned Work Orders (WO) - Form Table

| Menu Fnc: | Summary | Equip | Notes | Docs | Forms | Activity | Bills | History |
|---|---|---|---|---|---|---|---|---|

Data Processing Note: Convert Customer Form into Data Entry Forms

FIG. 3H

Configured Table - Assigned Work Orders (WO) - Activity Table

| Menu Fnc: | Summary | Equip | Notes | Docs | Forms | Activity | Bills | History |
|---|---|---|---|---|---|---|---|---|
| User | Date | | Time | | Duration | | Action | |
| | | | | | | | fnc. | |

FIG. 3I

Configured Table - Assigned Work Orders (WO) - Bills Table

| Menu Fnc: | Summary | Equip | Notes | Docs | Forms | Activity | Bills | History |
|---|---|---|---|---|---|---|---|---|
| Type | Name-descript | Price | Quantity | Rebate | Tax | | Total | Action: fnc. |
| Data | data | etc | | | | | | |
| | | | | | | | | |
| BALANCE | | | | | | | | |
| | | data | invoice no. | amt. bill | amt. Cr. | | Bal. | |

FIG. 3J

Configured Table - Assigned Work Orders (WO) - History Table

| Menu Fnc: | Summary | Equip | Notes | Docs | Forms | Activity | Bills | History |
|---|---|---|---|---|---|---|---|---|
| date/time | Activity type | | | descript | | | user | |
| data | | | | | | | | |

FIG. 3K

Configured Tables - Main Menu - Top Level Selections

| Main Menu Sel: | Home | Customers | Work Orders | Tasks | Activity | Account | Help |
|---|---|---|---|---|---|---|---|
| sub-menus | | | Work Orders | Tasks | Schedules | See below | |
| | | | Equip | Reports | Notifications (s-2d) | | |
| | | | Reports (sub - 2d) | | Locations (s-2d) | | |
| | | | | | Reports (s-2d) | | |

Account Sub menus: Users, Partners, Devices, Products, Settings, My Settings, Admin
Reports Sub-2d ("s-2d"): Work Orders; Balance Sheet
Notification Sub-2d: Notifications, Messages, Alarms
Locations Sub-2d: Last Known, Task Person Time Sheet; Task Person Geo Path
Reports Sub-2d: Activity Report

FIG. 3L

Configured Tables - Activity - Schedule

Fnc: Daily Sel.; Monthly Sel; etc.
    Fnc.: Select User
    Fnc.: Select all users by group
    Fnc.: Select User y Smart Phone Device
    Fnc.: sel. geo. device or group geo. device Display Daily Calendar as per user selection (U-sel)

| Time Block | Person A | Person B | Person C |
|---|---|---|---|
| 8:00AM1 | xx | xx | xx |
| 8:30AM | | | |
| 9:00AM | | xx | xx |
| etc. | | | |

FIG. 3M

Configured Tables - Activity - Notifications

Fnc: Daily Sel.; Monthly Sel; etc.
    Fnc.: Select User
    Fnc.: Select all users by group
    Fnc.: Select User by Smart Phone Device
    Fnc.: sel. geo. device or group geo. device Display Daily Calendar

| Time Block | Person A | Person B | Person C |
|---|---|---|---|
| 8:00AM | | | |
| 8:30AM | xx | | |
| 9:00AM | | | xx |
| etc. | | | |

FIG. 3N

Configured Tables - Activity - Location - Last Known

Display Geo Map with Location Pointer ("Loc. Ptr.")
    Fnc.: Show all smart phones in group
    Fnc.: Select User with Smart Phone
    Fnc.: sel. geo. device or group of geo. devices DISPLAY GOOGLE MAP HERE with loc. Ptr(s).

FIG. 3O

Configured Tables - Activity - Location - Timesheet Tracker

Fnc: Daily Sel.; Monthly Sel; etc.
    Fnc.: Select User and user assigned devices
    Fnc.: Select all users by group
    Fnc.: Select Smart Phone Device or group or smart phones
    Fnc.: sel. geo. device or group geo. device Display Daily Calendar

| Time Block | Task Person A | Task Person Smart Phone | Task Person Comp. Tablet |
|---|---|---|---|
| 8:00AM | data | data | data |
| 8:30AM | | | xxx |
| 9:00 | ccc | ccc | |
| etc. | | | |

FIG. 3P

Configured Tables - Activity - Location - Geo Tracker

Display Geo Map with Location Pointer (:Loc. Ptr.")
    Fnc.: Show all smart phones in group
    Fnc.: Select User with Smart Phone
    Fnc.: Select all users in a group
    Fnc.: sel. geo. device or group of geo. devices DISPLAY GOOGLE MAP HERE with loc. ptr(s)

| Critical Marker/ Type | Status | Time - start time and time on site | Approx. - distance |
|---|---|---|---|
| data | idle, moving, out of range | data | data |
|  | Total | data | data |

FIG. 3Q

Configured Tables - Activity - Reports

Activity Id
User (select pull down menu)
Customer
From: day input or display "select calendar"
To: day input or display "select calendar"

FIG. 3R

Configured Tables - Account - All Submenus

Account Sub menu: Users, Partners, Devices, Settings, My Settings, Admin
Data processing note: Common configuration tables, customizable, extendable

| Task Person TP-A | TB-B | TP-C | Equip-A1 |
|---|---|---|---|
| ⑦:00 | | | |
| 30 | | | |
| ⑧ | (Mgr- not assigned) | | (not assigned) |
| 30 | | | |
| ⑨ sch: TP-A1 Geo.Loc. Task 30  A-1 | | | |
| ⑩ | | | |
| 30 | | | |
| ⑪ | | | |
| 30 | | | |
| ⑫ TP-A 30  Privacy Block | | | |
| ① | | | |
| 30 | | | |

FIG.7B

| Pointer | Status | Time-Duration | Distance (office) |
|---|---|---|---|
| 1 | idle | 8AM to 8:15AM; 15min | n/a (note office log) |
| 2 | move | 8:15AM to 9AM;45 min | .05 miles |
| 3 | idle | 9AM to 10AM; 60min | n/a (note: Task loc. A-1) |

Rule Category Table - FIG. 19A

| Category/Sys. Event Detected | Ex: 1st Sys. Result Event | 2nd Sys. Result Event |
|---|---|---|
| 1. User Events | | |
| User Added | | |
| User Deleted | comm notice | follow-up with T-P mgr., HR response |
| 2. Customer Events | | |
| Customer Added | | |
| Customer Deleted | comm notice to T-P and T-P mgr; rpt "why" | 3 mth follow-up, targetted coupon |
| Customer Status Changed | | |
| Customer Note Added | | |
| 3. Task Events | | |
| Task Added | mgr assign TP-task; assign T-P; assign Equip | T-P sch; conflict clear; Equip sch and clear; final WO; Mgt OK; assign shift mgr; execute |
| Task Assigned | | |
| Task Status Changed | | |
| Task Note Added | | |
| Task Not Completed Before Expected Date | | |

Rule Category Table - FIG. 19B

| Category/Sys. Event Detected | Ex: 1st Sys. Result Event | 2nd Sys. Result Event |
|---|---|---|
| 4. Work Order Events | | |
| Work Order Added | mgr assign TP-task; assign T-P; assign Equip | T-P sch; conflict clear; Equip sch and clear; final WO; Mgt OK; assign shift mgr; execute |
| Work Order Deleted | | |
| Work Order Status Changed | | |
| Work Order Added by Customer | | |
| Work Order Assigned | | |
| Work Order Custom Status Changed | | |
| Work Order Closed | | |
| Appointment Added | | |
| Appointment Deleted | | |
| Appointment Confirmed by Customer | | |
| Appointment in X Minutes | | |
| Note Added by Customer | | |
| Note Added by User | | |
| Service Contract Expired | | |
| 5. Geo-fencing Events | | |
| Entering Area | | |
| Exiting Area | | |
| Entering Appointment Area | | |
| Exiting Appointment Area | | |

Rule Category Table - FIG. 19C

| Category/Sys. Event Detected | Ex: 1st Sys. Result Event | 2nd Sys. Result Event |
|---|---|---|
| 6. Device Events | | |
| Critically Low Battery Level | | |
| Low Battery Level | comm notice to TP-A | rem em to TP-A |
| Location Mode Changed | | |
| Device Started | | |
| Device Stooped | | |
| Device Crashed | | |
| Device Not Responding | | |
| Device Location setting: "Use GPS Satellites" is off | | |
| Device GPS Disabled | | |
| No GPS location in X minutes | | |
| 7. Message Events | | |
| Message Not Read | | |
| User Emergency Message | | |
| 8. Time Based Events (Automated Reports...) | | |
| Time Of Day | | |
| Day Of Week | | |
| 9. Reminder Events | | |
| Reminder Expired | | |

METHOD AND SYSTEM TO DEFINE IMPLEMENT AND ENFORCE WORKFLOW OF A MOBILE WORKFORCE

This a regular patent application based upon and claiming the benefit of provisional patent application Ser. No. 61/545,938 filed Oct. 11, 2011, and Ser. No. 61/545,948 filed Oct. 11, 2011, and Ser. No. 61/545,930 filed Oct. 11, 2011, and Ser. No. 61/545,957 filed Oct. 11, 2011, the contents of which are incorporated herein by reference thereto. This patent application also incorporates by reference the contents of U.S. patent application Ser. No. 13/649,753,entitled "A Method and System to Analyze Time Stamp Location Data to Produce Movement and Idle Segments" filed Oct. 11, 2012, and U.S. patent application Ser. No. 13/649,773,entitled "Time on Site and Point of Interest Tracker with Privacy Block" filed Oct. 11, 2012, and U.S. patent application Ser. No. 13/649,714, entitled "Method and System to Record and Visualize Type, Time and Duration of Moving and Idle Segments" filed Oct. 11, 2012 and U.S. patent application Ser. No. 13/649,737, entitled "Method and System to Record and Visualize Type, Path and Location of Moving Segment" filed Oct. 11, 2012.

The present invention relates to a system, a method and a computer program to track mobile workforce or task persons using a GPS-enabled cellular phone, tablet or other electronic device. Temporal or time based rules are preprogrammed into the system unique to the task situs location. Territorial or geographic rules are also preprogrammed into the system. The method sends communications notices are generated based upon a rules violation to designated persons.

BACKGROUND OF THE INVENTION

It is well known that service men and women and sales persons who visit customer locations throughout a wide geographic territory are oftentimes delayed in meeting appointment times. These appointment times are set, in advance, to provide service, repair and goods to the customer at the customer's location or site or to engage the customer in conversations and demonstrations in an effort to sell goods or services to the customer or prospective customer. With the advent of GPS-enabled electronic devices (cellular telephones, smart phones, tablet computers and other devices having GPS-enabled circuitry), it is easier for the person assigned to the task (the service man or salesman) to locate the customer. However, a problem still exists if a number of customers are scheduled for a single day or if the task person must visit other stores or locations to collect additional service personnel or equipment or supplies (vendor locations) in order to complete the task at the customer's location.

Databases and spreadsheets (a spreadsheet being a two dimensional database) have been developed to provide customer service and improve customer relations through the use of computer programs and computer systems. Notwithstanding these tools, business have experienced difficulty in monitoring mobile work forces and sales forces which need to visit the customer site to close a sale or repair equipment or provide other services at the customer's location. The present system and method seeks to solve problems associated with a mobile workforce.

Many systems have been implemented for determining a geographic location and other parameters, of a device associated with persons, things, or apparatus at a given time. Conventional systems are typically designed to report those raw locations as such without further analysis most notably as to what the actual movement segments are (moving, idle, etc.).

Conventional systems are typically designed to report those raw location data without any indication as what are the actual movement segments of the GPS-tracked person or object and without depiction of the corresponding path and how that geo-data relates to the corresponding appointment locations. There is a need to visualize the type and path and location of each individual movement segments (as well as visualizing the corresponding appointment location if applicable).

There is a need for a reliable and automated method to identify the corresponding movement segments. There is a further need to visualize the time and the duration of the individual movement segments (as well as visualizing the corresponding appointments/schedule/calendar/work order/task id/customer/point of interest). Also, there is a need to map the movement, path and location of task persons and equipment

OBJECTS OF THE INVENTION

It is an object of the present invention to provide a comprehensive mobile work force solution that improves work force capability, productivity and visibility as well as improve the quality of the customer experience.

The present system exploits the GPS features of a smart cellular telephone or a tablet computer with a web based platform which enables management and assigned task personnel to track, locate, capture data, and record events both automatically and manually to provide service to the business' customer.

It is another object of the present invention to provide an integrated platform for customers, work orders, tasks activities and parts and products inventory management and integrate smart phone features such as real time communication, location, navigation, audio information, image data, signature data and payment processing directly to the user's and customer's location.

It is a further object of the present invention to analyze time stamp location data or GPS signal data from a GPS-enabled cellular, tablet computer or other electronic device in order to apply temporal and territorial rules to the movement and idle for the task person (user) utilizing the GPS signal data.

It is another object of the present invention to transform the series of GPS signal data into indicator data and record the data from the set of time stamped location data.

It is an object of the present invention to provide time based and location based sets of rules unique to a task situs location, some of which are also unique or associated with an event time.

It is a further object of the present invention to provide groups of communications events which are generated by the method and the system when the temporal or time-based rules are violated, different communications events are generated when the territorial rules are violated and further communications events are generated when associated temporal-territorial rules are violated.

It is another object of the present invention to provide communications to hierarchically related individuals and companies when certain rules are violated.

Other objectives and advantages of the present invention are discussed later herein.

BRIEF DESCRIPTION OF THE DRAWINGS

Further objects and advantages of the present invention can be found in the detailed description of the preferred embodiments when taken in conjunction with the accompanying drawings in which:

FIGS. 2A-2K diagrammatically illustrate tables with database fields or spreadsheet fields for one embodiment of the invention.

FIGS. 3A-3R diagrammatically illustrate configured tables for another implementation of the present invention.

FIG. 7B diagrammatically illustrates a example of a daily calendar prior to the acquisition of GPS location data for GPS-enabled personnel and equipment.

FIGS. 19A, 19B and 19C provide examples of categories, as system events, which trigger resultant system communications and follow-up automated events in accordance with one embodiment of the present invention.

SUMMARY OF THE INVENTION

Figure 1:
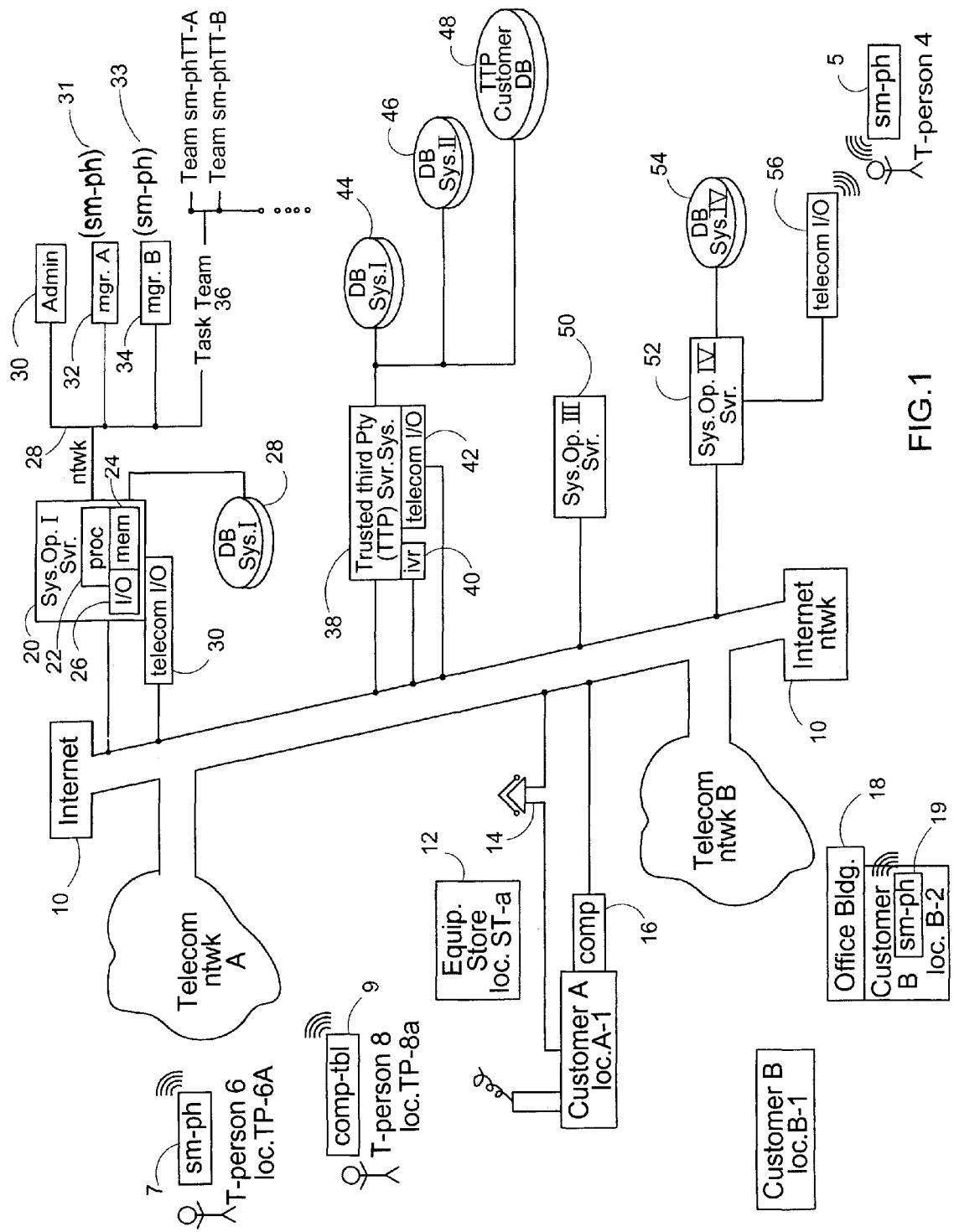
FIG. 1 diagrammatically illustrates a system diagram of the invention and various configurations of the method over a distributed computer system.

The present computer based invention, system and computer program manages a mobile workforce with task persons who use GPS enabled cellular telephones, tablet computer or electronic devices. The term "mobile task force" includes equipment tagged with a GPS-enabled device. The system converts the GPS signal data from the GPS enabled devices into time-based location data. The method and system is operative with a database populated with task situs location data, event time data and task person data. The task person data is represented by contact data for that task person. The database also includes contact data for the designated persons who receive communication notices from the system. The database is coupled and electronically connected to a web-based processor which in turn is coupled to a telecommunications network. The GPS enabled device is further coupled to the telecommunications network. The method and system permits the system operator (sys op) or the organization using the system to program or set temporal (time) based rules unique to the task situs location. Further, the system enables programming (pre-programming) of territorial rules unique to the task situs location and other areas near that location. The system permits the operator to preprogram and associate some temporal rules with corresponding location rules. When the temporal rules are violated, a first communications event is initiated by the method and system. As an example, the first communications event may be an sms or text message to the task person on site indicating that he or she has an exceeded a time-based limit at the task situs. This is a message that the time duration on site has been exceeded. As an example of territorial rules, when the territorial rules are violated, such as when the task person leaves a designated site (or a space about the designated site) without authority, a second communications event is initiated by the system. The second communications event may be a system generated voice call, generated by interactive voice response (IVR), to the task person on site. When the associated time and territorial rules are violated, a third communications event arises. As an example, an associated time and territorial event may be that the task person, driving to a task situs, must pass through a certain intersection within a certain time frame in order to be present at the designated location at a certain time. In this manner, both time and location rules are provided for and, if the driver is not at the designated location within that designated time (or pre-determined time period), a rule violation is detected by the system. The third communications event may be an email, an sms message, or a system "ping" to a manager or the task person. Upon detecting the event (sometimes called a "violation," but other "out of range" terms may be used to describe the deviation beyond the scope of the preprogrammed rule), the system then sends preprogrammed first, second and third communications events to designated persons associated to the task person and/or the task person. The time based rules may be associated or correlated with the event time for the task. The event time may be the expected "time of arrival" on the customer site. Further, temporal rules may be applied to various locations such as: triggered upon approach to a location, triggered on entry to a location, and triggered when the geo-location of the task person matches the geo-location of the task situs. Also, the temporal rules may include a limit on the duration of time at the task situs. In a similar manner, territorial rules may include proximal territories near the task situs, intermediate territories which are geographically larger than the proximal territory and the distant or distal territory which is geographically larger than both the proximal and the intermediate territories. The designated persons may include superiors and co-workers. Preferably, the designated persons are hierarchically related to each other and the task person such as a shift manager for the task person, a project manager and a corporate officer assigned to the entire project. Further, the system may include filters indicating that these rules are not applied during certain times of day, and during certain days of the week. Another important feature, among many, includes engaging a communications event which includes pre-programmed content or, a request to the designated person to supply content to the communications notice which comm notice is ultimately delivered to the designated persons.

DETAILED DESCRIPTION OF THE PREFERRED EMBODIMENTS

The present invention relates to a method and a system to analyze time stamp location data and to produce movement and idle data segments which are utilized to provide time on site indicator data. Further, the present invention relates to a method, a system and a computer program product that records and visualizes the type and the path (or location) of each movement and idle segment from a set of time stamped location data. Similar numerals designate similar items throughout the patent specification. Some abbreviations in the drawings and the patent specification are identified in the Abbreviations Table at the end of the specification.

Basic System Description and Advantages

The system provides a comprehensive mobile workforce solution that improves workforce capability, productivity and visibility as well as the quality of the customer experience.

The system employs advanced software components, modules and data acquisition and processing methods which exploit the unique smartphone and computer tablet capabilities and a web-based platform enabling management and assigned task personnel to track, locate, capture data and record events both automatically and manually, thereby providing better service to the system operator's customers.

Customers, work orders, tasks, activities, parts/products and inventory management, forms, workflow automation, messaging and all the capabilities the smartphone brings (real-time communication, location, navigation, audio, image, signature, and payments) are seamlessly integrated into a series of user-friendly interfaces to empower the mobile workforce and provide a superior customer experience.

The system operator employs a web browser which is enabled at different levels of control for the front office, the back office, the assigned task person, task team members, management, and, to a limited extent to customers. These customizable interfaces provide real time results and time-and-location based planning and task execution. From the customer's view, he or she can now see the time-to-arrival and any impediments blocking the access to service, repair or sales call by viewing the customer portal.

The system uses smartphone capabilities (real-time communication, location, navigation, audio, image, signature, and payments) (also available from GPS enabled computer tablets and other GPS and telecom enabled devices) and integrates data from those devices with data from the front office, the back office, the task person, team members and management, and presents the same in an orderly fashion to the authorized party.

The system is suited for field services as well as other businesses that employ a fleet of mobile workers who execute activities outside of the office, such as sales, business development and customer service.

Application functionality and corresponding benefits are designed for mobile workers, managers, office coordinators and customers.

The GPS enabled cellphone, computer tablet or other electronic device with a telecom link is loaded with native applications that securely communicate over the Internet with the system operator servers, delivering inbound and outbound messages to track, exchange information and manage activities Office coordinators and management log in to web portals to create and update customer data, work orders, tasks, establish appointments, send notifications and access reports. The system is an extension of the system operator's customer relationship management (CRM) system and enterprise relationship program (ERP) enabling the system operator to extend its existing platform to the mobile world.

Customers are provided with access to a secure web portal to review appointments, create new orders and track workers on a time-based format and a geo location format. The system can be further integrated with interactive voice recognition (IVR) features to provide an audio phone based interface for customers.

The system improves workforce capability, productivity and visibility, which translates to cost and time savings, increased revenues and peace of mind. The system permits the system operator to configure a unique customer access portal to view a wide range of task person data (time to customer location, current location, estimated impediments, customer enabled input to add or alter customer contact data (home phone to cell phone to business phone). Accordingly, the customer is provided with more transparency and visibility, which results in a far superior customer experience and a competitive advantage.

Data acquisition and data processing modules are integrated together to provide a seamless and intuitive user interface at various control levels.

Customer Management Module (system operator ("Sys Op") controlled): Customers (including prospects), contacts, locations, custom forms, notes, history, appointments, customer relationship details such as previous work orders, documents, billing, invoices and payments, customizable processing rules, bulk provisioning, and reports.

Work Order Management Module: Drag and drop appointment scheduling, automated route planning (based on schedules, locations) and optimization, automated creation based on rules (service contracts), location based directions and navigation, notes, invoicing and payments, history, customer relationship details such as previous work orders, products/parts and inventory management, documents (audio, images), custom forms, signature capture, customizable processing rules, and reports.

Task Management Module: Drag and drop ordering, list management, expected completion dates and automated reminders, resource assignment, categories, access control, location based directions and navigation, documents (e.g. audio, images), customizable processing rules, and reports.

Activity Management Module: Drag and drop management of appointments, work orders and task scheduling, with real times updates to both office and mobile workers, automated time and travel tracking and billing with real location data (e.g. expense reports management), automated mobile worker location and movement tracking, time-on-site analysis, plan versus actual metrics for analysis and optimization.

Notifications (including emergencies and high risk situations) Module: Send/Receive alarms, messages, automated notifications reminders whenever attention is required. In case of an emergency, the task person—mobile worker can notify the Sys Op in two (2) clicks on the smart phone that the task person needs immediate and urgent help. In high risk working conditions, the automated watchdog mechanism immediately notifies the Sys Op if a mobile worker is not responding.

Account Management Module (web only designed for office): Extensive workflow automation framework (rules, filters, actions) to automatically exploit all the underlying information (e.g. automatically determining that a mobile worker is going to be late for an appointment), forms definition (including subforms and dynamic number of items), extensive set of customization parameters (including custom print views for forms, invoices and work orders), access control roles/permissions (template based as well as custom, individual and/or group of users), plus automated inventory.

The system and method is smartphone and GPS-enabled tablet based. There is no need for custom hardware to be installed on a vehicle, and no need for mobile workers to carry a costly, bulky and slow laptop.

The system is platform agnostic in that the system works on GPS-enables cell phone such as: BlackBerry™, Android™ (Apple, Microsoft on roadmap), and iPhone™ and iPad ™.

The system is carrier agnostic and works on any telecom carrier (e.g. AT&T, Verizon, T-Mobile, Sprint, VodaFone).

The system is customizable by the Sys Op for any particular business or service. The system uses XML based APIs to interface with 3rd party software.

Smart Device Integration Features

The system and method exploits the software and hardware capabilities provided by the GPS-enabled smart electronic devices linked into the telecom system. The integrated features include: Navigation system including audio driving directions; Signature capture; Image capture; Audio capture; Video capture; Location capture; 1D and 2D (QR codes) bar codes capture; and Payment capture (including NFC when available) (near field communication payment systems).

Examples of these uses of the system are: (A) Delivery Service: Worker uses the system to view his next appointment, clicks on navigation for directions, arrives at the delivery point (location is tracked), scans a 2D code, captures customer signature. (B) Sales: Worker views list of customers/prospects to visit, upon arrival receives custom action checklist, allow customer to use QR code coupon, captures payment and signature. (C) Account Manager: Worker arrives at customer site, updates system database with latest info, adds audio trip report and photo, records video of customer testimonial.

The system and method provides Location Tracking and Movement Analysis.

Component Features such as (i) Advanced location tracking and reporting with multiple operating modes (continuous, business hours, points of interests) for privacy control and/or battery optimization. (ii) Automated movement intelligence including time on site and location-to-point-of-interest matching for idle segments. (iii) Privacy and access control framework to respect and guarantee the privacy of your employees. Integration with System rules engine to enable location & movement triggered actions.

Examples of these uses of the system are: (A) Mobile worker enters or leaves an area which triggers a 'geofencing' activity such as a billing timestamp, or an email alert to a customer when within 5 miles. (B) Mobile worker is leaving appointment, the system triggers a custom "System form" for worker to complete (e.g. appointment report). (C) Automatically track the amount of time spent at each customer by workers and deliver a report to management analyzing face time. (D) Automatically generate an alarm if a device/vehicle is moving at night, if an advertising truck is idle or outside the area it is supposed to be in. (E) Help to retrieve a lost device based on current or last known location. The geo-location tracking and the correspondence with the task situs and the time-on-site factor can all be integrated into a accounting and billing system which is useful to the system operator, manager and customer. In this manner, the system can be configured to send a message at the completion of the task to the manager and the customer. This proof of service feature is beneficial.

The system and method provides Workflow Automation enabled to provide: (i) A rules based framework based on triggers, filters and actions to customize the Sys Op solution to its business needs. (ii) Wireless forms framework. (iii) Notifications and Reminders framework. (iv) Extensive customization support.

Workflow Automation functions include: (A) An "Office" alert and display configured to create a custom form to be displayed on the smart device every Friday at 2:00 PM (time and day trigger) to enable input of a weekly status report. (B) The system can display a form or checklist when a worker arrives at an appointment. (C) Set a rule for a coordinator/worker/manager to be notified by email or text whenever a mobile worker is going to be late for an appointment. (D) Create a set of rules to detect abnormal conditions such as a vehicle moving at night or outside of a given area, or if a user is idle more than a certain amount of time (e.g. advertising truck).

The system and method provides Activity Scheduling, Tracking and Reporting to provide: (A) Drag and drop scheduling of appointments, work orders & task lists, with real times updates to workers. (B) Planned versus actual visualization and metrics, with the actual automatically created by this system component.

The system and method provides Mobile Planning by creating optimized route to save on fuel costs and limiting delays by finding the most efficient path in terms of mileage and traffic conditions.

The system and method provides privacy and access control framework for the task person.

A mobile worker's (task person's) schedule is updated during the day with a new and an optimized plan of activities, thereby eliminating paper plans and permitting the Sys Op to reduce paper and ink usage and achieve environmental goals.

The system and method provides Activity and Expense reports which can be validated by system audit trails. For example, a manager can receive a report every morning with activity details for entire mobile team: % late, % on site, which customers had access to the task person, face time with customers, and number of customer visits. A consulting services company can automatically track distance and time allocations of all their mobile workers to customers for billing purposes.

The system and method provides a Customer Self Service Portal with the following features. (A) A configurable and customizable web based portal which can be branded as needed by system clients. (B) A 24/7 real time view of work orders, with the ability to update or create new ones. (C) Visibility by customer into worker movement and arrivals. (d) An IVR phone based voice presentation to the customer portal. (D) Notifications via SMS (short message service) or email based on workflow rules. (E) Customer satisfaction monitoring via automated surveys.

The Sys Op decides to enable their customers to view location and estimated arrival time of visiting service worker by logging in to a secure web page, or to request to be notified when the mobile worker is within X predetermined miles of their location. The Sys Op Customer can provide quality related feedback via an online survey in the portal or by email. The Customer is able to order additional services via access to live work orders. This "add services/goods" feature permits the Sys OP, upon the real time request of its customer, to provide additional goods or services to the customer or enable cross selling of goods and services to the customer without requiring live human resource.

The system and method provides a Real Time and Secure Information Exchange with the following features: (A) Optimized for smartphone and limited bandwidth environments. (B) Caching mechanism to enable access to critical data even when the device is out of range. (C) Open set of APIs to enable extension of 3rd party applications such as ERP/CRM to the mobile world. (D) Mobile workers have immediate and real time access to the latest customer information, products, and inventory. (D) Customer profiles can be automatically relayed to the worker's handheld prior to arrival, resulting in a prepared worker and a superior service engagement (or first call resolution rate, or sales close). (E) Mobile workers can remotely update the customer profile, capture critical data from the field, perform form based reporting, execute payment/billing transactions, and any other high-value activity that system has enabled for a smart device.

The system and method provides a wide range of settings for the Sys Op as follows: (A) Global Settings—define the settings that apply to all the users of the company (SMS, customer portal). (B) Payment Options—configure the payment options for work orders (Retainer, Credit Card, PayPal). (C) Rule-based operations—configure system operation. (D) Work Orders ("WOs")—configure work orders (the forms that are attached to a work order, the custom print view). (E) Customers—configure customers (the forms that are attached to a customer, the custom print view). (F) Forms Presentation and Data Input—configure Sys Op forms as data input and output templates. (G) Tasks—configure tasks (categories). (H) Activity—configure the custom activity types. (I) Quick Launch Settings—configure links that appear in the "Quick Launch" panel. (J) User Permissions Templates—configure the user permissions templates that can be assigned to users.

Time-on-Site

The System Time-On-Site module is an automated tracking & reporting solution for organizations that need to analyze the amount of time their workers spend on site, but without infringing on their personal privacy.

The System Time-On-Site tracks the amount of time each worker spends at predetermined locations such as customer or project sites without tracking their personal or professional whereabouts and activities in between. If the Sys Op is interested in tracking and visualizing all movements and locations, the general system operations described above enables that feature.

System Time-On-Site provides automated and concise reports that are sent by email daily and weekly (time, day of the week, date, date range, frequency, destination are all fully customizable). In addition, the reports can be generated for any given time frame or combination of users via the web interface.

System Time-On-Site is a solution that provides key visibility and insight (e.g. which customer was visited and for how long, how long ago was that specific customer location visited and by whom?) while simplifying the day-to-day tasks of the Sys Op mobile workforce (automated activity report, expense report documentation and validation) as well as giving the task person or mobile worker the peace of mind that their privacy rights are secure and respected.

A summary of the Time-On-Site module follows. The GPS enabled smart phone or computer tablet or GPS enabled electronic device, with a telecom link, is carried by the mobile worker. The GPS enabled smart device contains a System Time-On-Site native application that captures the locations of the user—task person and securely communicates that geo location, time and date data to the system's web based servers. On the server side, the Time-On-Site module analyses those locations and computes actual movement versus idle segments. For each idle segment, System Time-On-Site searches from the list of predefined points of interest (for example, customer or partners address or a geographic area defined by a center point and a radius or predefined spatial region about the center point to find a match. If there is a match, the corresponding idle segment is saved and it will be used as part of the reporting. Otherwise, it is discarded.

Office Coordinators and Management automatically receive a daily and weekly summary report by email. These authorized Sys Op persons can also log in to their web portal for real-time access to the geo tracking information or to generate the report for a given time frame and user(s) and Geo-enabled devices.

Additional features of the Time-on-site module include: (i) Associate actions (email, forms to be filled out) whenever the mobile worker enters or leaves a location. (ii) Capture and visualize the entire path of the mobile worker (e.g. to automate and securely generate expense reports). (iii) Capture critical information from the field (payment, signature, audio, images). (iv) Use the system APIs to automatically provision and maintain the Sys Op list of relevant addresses. (v) Add automated surveys to ensure quality of service and get customer feedback.

Further, the time on site module can be enhanced to record and visualize the type, beginning time, ending time and duration of each movement segment from the movements of a person, thing, or apparatus associated to a device that records the corresponding geographical locations and time stamps. The resulting chronological output is based on the traditional time sheet format except that each individual time block corresponds to a movement segment (Idle, Moving . . . ). Each block also has an associated link to visualize the corresponding details (type, duration, beginning time, end time, distance (if applicable) . . . ). This method can also be used to visualize the appointments in conjunction with the corresponding movement segments.

Details of the General System

FIG. 1 diagrammatically illustrates a system diagram of the present invention. It should be noted that the method and computer system can be located on a singular server controlled and operated by single Sys Op, or, in the alternative, the method and system can be distributed over a plurality of computer systems and networks. FIG. 1 diagrammatically illustrates both a centralized operation of the method as well as a distributed operation of the method.

FIG. 1 shows a task person T-person 6 at location TP-6a. Task person 6 has a smartphone 7 which communicates via a cellular telecommunications network to telecom network A. Telecom network A is connected to internet 10 which in turn is coupled to a plurality of computer systems. Sometimes, the Internet is referred to as a telecom network. The general operations of these computer systems are known to persons of ordinary skills in the art. Only major system modules associated with the inventive system and method are discussed herein.

Task person T-person 8 is located at location TP-8a. Task person 8 carries with him or her a computer tablet 9 that has telecommunications link to Telecom Network A or Telecom Network B. Both smartphones 7 and computer tablet 9 and other GPS-enabled devices use a satellite supported global positioning signal (GPS) which is detected by devices 7, 9. The GPS signal is utilized by smartphone 7 and computer tablet 9 to mark its location and provide information to persons 6, 8.

These task persons may be required to visit equipment store 12 at location ST-a prior to visiting customer A at location A-1, customer B at location B-1 or any other customers. Customer A at location A-1 has a telephone 14 which is diagrammatically illustrated as being connected to the telecommunications network which includes Internet 10. Customer A also includes a computer 16 which is linked to a telecommunications network and ultimately to Internet 10. Telecom network A and telecom network B are either integral with Internet network 10 or can be effectively considered an extension of Internet 10 utilizing common telecommunications system such as land line, satellite and cellular telephone communications systems. Customer B has a service location at location B-1 but currently customer B is located in office building 18. Customer B carries with him smartphone 19. Office building 18 is at location B-2 which is distant from customer B location B-1. Therefore, when customer B who is carrying smartphone 19 needs to visit the service person or sales person at location B-1, the cell phone 19 of customer B should be utilized to arrange and coordinate the simultaneous visit of task person 6, 8 at location B-1 with customer B at location B-1. As discussed later, this coordination of both the service person or task person and customer B at distant location B-1 is accomplished.

Internet 10 or telecommunications network 10 is connected to System Operator I server 20. Server 20 includes a computer processor 22 and a memory system 24 and various input/output devices 26. These devices cooperate and permit Server I of System Operator I to communicate with database 128. Additionally, System Operator I server 20 utilizes telecommunications input/output module 30 to communicate with smartphones 7, 19 and tablet computer 9 as well as customer A computer 16 via Internet 10, telecommunications networks A and B. System Operator server I is further connected to a network 28 linking the server I to an administrator computer 30, a manager A computer 32, a manager B computer 34 and various task team members 36. Task team members 36 have team member smartphone TT-A and smartphone TT-B. Manager A also has his or her cell phone 31 and manager B has her cell phone 33. As described later in conjunction with the Tables 2A to 2K and Tables 3A to 3R, System Operator I server 20 can fully engage all the features of the present invention.

However, there is a distinct benefit in utilizing the present method and the computer system in a distributed manner such as a software as a service (SAAS). In this distributed computer system and method, the present invention utilizes a trusted third party (TTP) server system 38. TTP server 38 includes all the elements customarily found in computer systems including interactive voice response (IVR) module 40 and telecommunications input and output module 42. TTP server 38 interacts with a plurality of databases effectively isolating sensitive data from System Operator I in database system I-44 from the data from System Operator II and database II-46. Customer data of the trusted third party System Operator 38 is stored in TTP customer database 48. Of course, a singular database may be utilized and different portions of that database would hold the secure or secret information for System Operator I as compared with System Operator II and as further compared with TTP customer database 48.

Internet and telecommunications network 10 is also connected to System Operator III server 50. System Operator IV server 52 is further connected to the telecommunications network 10. System Operator IV has access to database system IV-54. System Operator IV utilizes its own telecom input and output 56 which generates satellite communications links to task person 4 who retains smartphone 5.

FIGS. 2A to 2K diagrammatically illustrate a number of tables having field identifiers which are useful for carrying out the basic elements of the present invention. In "activities today" table in FIG. 2A has data fields for the title of the activity, the user who is viewing the activity, the time of the activity as well as the work order (WO) task, customer in action. All these tables can be reconfigured to closely match the business of the System Operator.

The abbreviations used in the Tables and in FIG. 1 are sometimes identified in the Abbreviations Table at the end of this patent specification. Otherwise, abbreviations are identified in the description of the invention.

FIG. 2B shows a Customer's Table which includes name, address, primary contact at the customer location as well as action associated with the customer.

FIG. 2C is a work order WO Table which identifies: the type of file operative for the open work order, the customer, the customer location, the status of the work order, a date and time for the projected delivery of goods or services at the customer location, the task person, and a field for confirming whether the task person recognizes (ACK) the assignment or not and an action field.

FIG. 2D is a list of equipment necessary to provide the goods or services at the customer location.

FIG. 2E provides an outline for the work order reports. These reports are generated both prior to the work being delivered at the customer location and also while the task person is at the customer location. Identification of a function ("FNC") is also shown in the Table. For example, under the "create report" header, the function (fnc) is YES which, when activated from the user on the smartphone or the web based interface portal provided by the system operator, the user (task person) can select YES generate the report and the system will generate an electronic fix copy of the report. In the absence of selecting YES, the system does not create the report. Hence, the create report has a function as identified in the table.

It should be noted that many, if not all, of these Tables are fully reproducible on smartphones carried by the user or task person.

FIG. 2F is a short form balance sheet for a particular customer. FIG. 2 G is a "task table" that identifies: the file type, the identification number of the particular task, the status of the task (pending, closed, open), the category of the task, a task description, a "data action required" filed, and a "status" field.

FIG. 2H is a "user table" (a task person table) with a login identifier name, a status and an action required field.

FIG. 2I list a "partner" table. Partners are well established customers or suppliers.

FIG. 2J is a table for "devices." Typically, "devices" listed in the Tables are the GPS-enabled electronic devices, cellphones, smartphones, computer tablets and other GPS-enabled devices, all of which include a telecommunications link.

FIG. 2K is a listing of the products.

FIGS. 3A-3R diagrammatically illustrate another group of tables which are partially complete and which represent a working embodiment of the present invention. FIGS. 3A-3R provide examples of the system. The system can be configured in various manners and the tables can be expanded or contracted to adapt to any particular business. However, FIGS. 3A to 3R represent at least one working embodiment.

FIG. 3A is a configured table showing the initial screen presented to the user who is logged in to the system. That screen includes four different sections a "new notifications" section, a "new-unassigned work order" section, an "assigned work order" section and an "activities today" section. This initial presentation can be altered by the user under his or her settings function. Under "new notifications," the fields for the database or spreadsheet (a two dimensional database) include type, Id for the notification, date, description, a function enabling the user to view the entire alarm or notification record, a function to enable the user to accept the notification and another function to permit the operator to delete the notification record. The user may select to various functions and this is noted in these tables as "u-sel." Therefore, a notification is set for an "alarm" with a notification id record "123" and is set for date "Oct. 10, 2011." The event is a potential low battery on a particular GPS-enabled device. The user can view the entire record by selecting V (view), can accept the notification (ACC or ACK), or can delete the notification (del).

The "new-unassigned work orders" table is typically presented to managers of the System Operator. The identification and the title of the work order is provided in the far left column. The customer and a customer location listed in the next column. The status of the unassigned work order is open, pending or closed. Dates and actions are noted in the Table.

For "assigned work orders," again, the title and id of the work force is provided, the customer, status, date and task person assigned to the WO is listed. Preferably, the phone number of the task person is also provided. This data is part of the task person data collection maintained in one or more of the databases 28, 44, 46, 54 in FIG. 1. As an example of a particular layout, the user is presented with certain functions external to the table identified as "X-Table fnc" or "XT-fnc"). Therefore, with respect to new and unassigned work orders, the user can select "go to page 2" of the unassigned work order, "go to page 3," etc. With respect to assigned work orders, the external table function is abbreviated "XT-fnc." The "Activities today" Table is self explanatory.

If the user or System Operator selects a particular notification from the initial screen, a table such as FIG. 3B is generated by the processor server 20 or 38. It is well known that computer systems and, in particular, web based computer systems utilize servers to provide a data display screen which enables the user at computer tablet 9, smartphone 7 and computer 16 to respond and input data and manipulate data presented by the server. FIG. 3B shows a configured table for new and old notification. The type of notification and id of the notification is indicated as "alarm 123." This is the same "alarm 123" as identified in FIG. 3A. Therefore, FIG. 3B shows all the data collection or data record for that notification 123. The notification includes a message, the date the message was acknowledged (ACK), who acknowledged the message, a criticality indicator or alarm, a status of the notification, the creation date of the notification record, the date the notification was adequately responded to (closed date) and who closed the date. With respect to "status," the data may reflect and acknowledgment ack, a pending indicator or a field to delete or indicate NO.

FIG. 3C is a configured table which the user sees once he or she selects the assigned work order WO from the main menu of FIG. 3A.

With respect to FIGS. 3C to 3J, the same menu functions are provided along the top row of the screen enabling the user to select a folder or directory under: summary, equipment records, note records, documents, forms, activities, bills and history. These directories or file selections are underlined in FIG. 3C-3J. The folder which is underlined and shown in bold has been activated in the particular figure. Therefore, FIG. 3C is a summary of the assigned work orders ("summary" shown in bold print), FIG. 3D is the "equipment associated" with a particular record, FIG. 3E are "notes" assigned to a work order, FIG. 3F are "documents" available for that particular work order. FIG. 3G is "forms" associated with either the equipment or the service to be provided to the customer for that work order. FIG. 3H is an "activity log" for the work order. FIG. 3I shows the bills or accounting for a particular work order and FIG. 3J shows the history of that work order.

Returning to FIG. 3C, the "summary" of the work order includes fields for status, date created, customer, location, the task assigned person, the projected appointment data, an estimate of the duration of the service (time on site) regarding how long the service person or sale person will be at the customer location. A confirmed status field as well as various functional inputs are provided. These functional inputs include the ability of the user who is viewing the FIG. 3C "work order summary" to "input" data, "see more data" on a particular field, "mark as critical" certain fields and aspects and data in that table, "acknowledge" that the work was done and "input more" data.

FIG. 3C also lists the travel time and the time-on-site which is calculated and stored as discussed later herein.

FIG. 3D is an equipment table associated with the work order. The equipment table can be changed to reflect any particular information necessary about the equipment.

FIG. 3E is a "note" associated with a particular work order. In FIG. 3E, the user can pull down a list of personnel such as the task person, the manager, the system operator, administrator. That selected person cna then annotate the Notes record for the work order WO. Therefore, the task person and anyone associated with that work order, such as task team 36 or manager A32 or manager B34 or administrator 30 can annotate the "note" record associated with a particular work order.

FIG. 3F are the "documents available" and FIG. 3G are "forms available" to the person. FIG. 3H shows an activity log for a particular work order.

FIG. 3I shows a billing table for a particular work order. FIG. 3J shows an accounting history for that customer.

It is important to realize that task person 6 carrying smartphone 7 or task person 8 carrying computer tablet 9 can access this information in Tables 3A-3R both prior to beginning the drive to equipment store 12, to customer location A-1 or to customer location B-1. In this manner, the information stored in all these tables is transparent to the entire management team.

FIG. 3K shows a main menu listing four top level selections. In other words, the user, when viewing the main menu, can select home, customer, work orders, task, activity, account or help. Sub-file or folders are available under the "work orders" folder which include work orders, equipments and reports. Under the "reports" sub-folders, is a series of secondary sub-folders or sub-subfolders which include work orders, and balance sheets. Under "task," the sub-folders are task and reports. Under "activity," the sub-folders are schedule, notification (with sub-folders notifications, messages and alarms), locations (with sub-subfolders last known, task person time sheet, task person geographic path) and reports (sub-subfolders activity report). The account main folder includes sub-folders for user, partners, devices, products, setting, my settings, and administration. Many of these tables and data input screen are discussed earlier in connection with FIG. 2A to 2K and 3A to 3R.

FIG. 3L shows a configured table for activity and schedule. The functions presented to the user include an option to select the daily time schedule for task person A, task B and task person C. Alternatively, the user can select a monthly calendar display. Additionally, the user may select all tasks assigned to a particular user or select "all users" by group name or select a user by smartphone or device. As stated earlier, the device is a listing of all the Internet and GPS-enabled devices carried by all task persons and managers administrators. Alternatively, the user can select the geographic device or group of geographic devices.

Under "display daily calendar" function, FIG. 3L has a vertical time blocks 8 AM, 8:30 AM and 9:00 AM extending down through the evening hours. The rows are identified by the Task Person A, B and C. If the user selects smartphone, the smartphone ids would be atop the column headers.

FIG. 3M is an "activity notification" Table which again shows a daily calendar identified by column headers for task person A, B and C. The user can select a single user in a monthly calendar display or all users in a daily calendar display as well as smartphone device or geographic or GPS-enabled device.

FIG. 3N is a last known location which displays a map with location points showing the last known location of a particular task person. The user can select smartphone in a group, or singular user with a smartphone as well as a GPS-enabled device or a group of GPS-enabled devices.

FIG. 3O is a location time sheet tracker. A display daily calendar shows task person A or task person smartphone or task person computer tablet with data filled in the row associated with a time block. Therefore, at 8:00 AM, task person A has data in their time block extending to 9:00 AM. Compared this data with the computer tablet listing only an 8:30 data entry. The user is permitted to select various users, groups or task persons or GPS-enabled devices.

FIG. 3P is a location and geographic tracker. This enables the user to select a task person, smartphone device, or various groups of devices. A map is displayed to the user and under the map is a critical marker Table identifying the critical nature of the task being reviewed. Maps from MapQuest™ or Google Maps may be used. Further, a status of the GPS-enabled device is shown. The status is idle, moving, or out of range. A total time of travel as well as a total of time on site is provided in this table.

The table beneath the geo tracking map also shows the start time as well as the time on site. An approximate distance to the customer location A-1 or B-1 is provided in this table.

FIG. 3Q discloses an activity Id, a user, customer and enables the user to input display or select calendar.

FIG. 3R discloses an "account" Table showing a sub-account for all users, partners, devices, products etc.

Details of the Movement and Idle Segmentation

Figure 4:
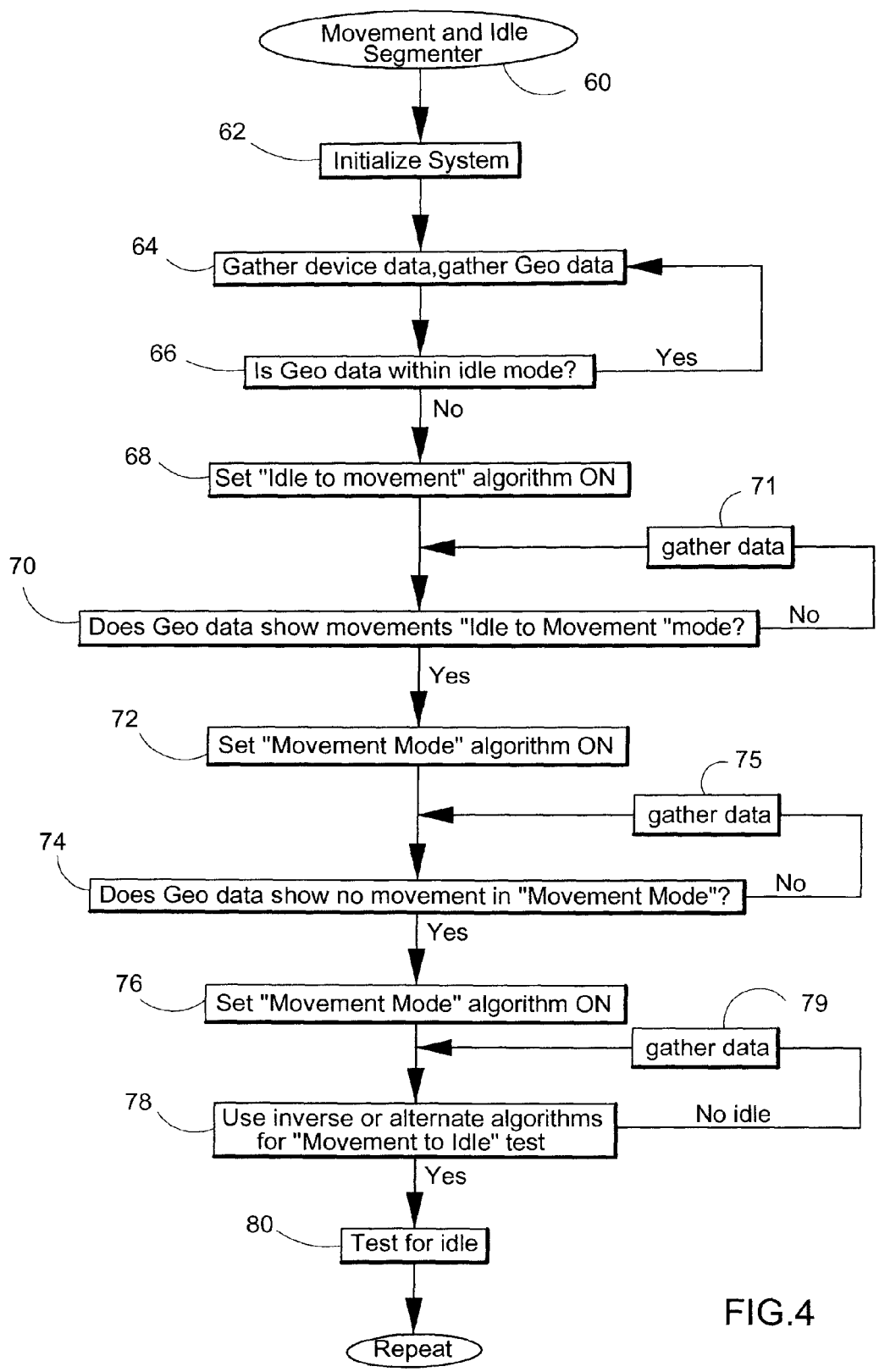
FIG. 4 diagrammatically illustrates the flowchart, routines and software modules for the movement and idle segmentor in accordance with the principles of the present invention.

FIG. 4 diagrammatically illustrates the movement and idle segmentor program in accordance with the principles applied throughout the system and method employed herein. In order to determine the travel time and provide travel time indicator data as well as on-site indicator data and time on site data, it is important to determine whether the GPS-enabled device is moving or is idle or at a singular general geographic location. The movement and idle segmentation routine 60 first initializes the system at step 62. In step 64, the system and primarily the web based process server gathers GPS data from smart-phone 7, computer tablet 9 or smartphone 5 as well as id data indicating which one of the GPS-enabled devices is sending this information. Currently, GPS-enabled devices record a GPS signal in the memory of the smart phone or enabled device. The present system opens a telecommunications channel between one of the web processors 20, 30, 50, 52 and the GPS-enabled devices 7, 9, 5. Currently, every 6 seconds (as an example), the web based interface on the processor-server (for example 20, 38), requests that the GPS-enabled device 7, 9 upload the GPS location and time stamp data to the web based servers 20, 38. An interface portal to the Internet, and ultimately to the GPS device is enabled by the server 20, 38. Therefore, the servers accumulate this GPS location and time data and store the same in the appropriate database 28, 44, 46, 54. It is this data that is processed by the processors in servers 20, 30, 50, 52.

In step 66, a test is made of the data to determine whether the GPS-enabled device is in an "idle" mode. If YES, the program repeats to step 64. If NO, the system executes step 68.

Equation 1 and Alternate Equation 1 which follows describe two algorithms to determine whether the GPS-enabled device is in an idle mode.

TABLE

Equation 1

Eq. 1: Is the distance between
    (centerpoint of p most recent geo.pts.)
    and
    (Centerpoint of n geo.pts.)
    less than an Idle-Thresold value (where p is different than n)
If YES, then geo within Idle zone
wherein n>p
Alternate Eq. 1:
    Obtain:
        loc. at t1
        loc. at t2
        loc. at t3
        Calculate centerpoint CP1 with loc. data at t1, t2, t3
        Determine if loc. at time tk < CP1 plus 25 meters
        ("25" = distance "D-idle")
        If YES, update Centerpoint CPk, within idle zone.
        If NO, execute next program step In Equation 1, the distance between two center points is compared. A center or "center point" is determined by taking a group of sequential geographic data and engaging an algorithm to determine the center of location of that aggregated geographic data. A center point CP of data group p for the most recently acquired geographic data is calculated. Also, a center point of a different group n of geographic data is created. The system determines the distance or difference between these center point data collections p and n. If the absolute value of the distance is less than an idle threshold value, then the system indicates that the GPS smartphone is in an idle mode. Generally, n geographic points is larger than p geographic points. With respect to alternate Equation 1, the location is obtained at times t1, t2 and t3. The center cp1 is computed. Of course, many more geographic points other than sequential times t1, t2 and t3 could be utilized. If the current location at time Tk is less than cp1 plus a predetermined value such as 25 meters called D-idle threshold, then the system determines that the smartphone is no longer in an idle mode. If the current geographic location is less than the cp1+distance threshold, the system notes that the smartphone is within the idle zone. If not, the system executes steps 68.

In FIG. 4, step 68 turns ON the "idle to movement" algorithm. The Equations 2A, 2B, 2C and 2D may be utilized in the "idle to movement" algorithm step 68.

TABLE

Equation 2

| | |
|---|---|
| Eq. 2A | Point to Point Velocity |
| | Is velocity at each acquired geo. pt. |
| | over time span (tspan1) increasing? |
| | (geo at t1 less geo at t2)/(t2 less t1) = vel. t2 |
| | (geo at t2 less geo at t3)/(t3 less t2) = vel. t3 |
| | Is vel. t2 < vel. t3 < vel.t4 < vel.t5? |
| Eq. 2B | Interval Velocity |
| | Distance traveled over Z, one minute intervals |
| | (geo at t1) less (geo at t1 plus 1 minute) = D-interval-1 |
| | (geo at t1) plus (geo at t1 plus 2 min) = D-interval-2 |
| Is | (D-interval-1) less (D-interval-2)/ (2 min) > a Velocity threshold |
| | Then movement detected. |
| Eq. 2C | Use center point data for "Point to Point" Vel and "Interval" Vel |
| Eq. 2D | Use center point data for t period prior to "Mode ON," |
| | t1, t2, t3, t4 all antecedent times prior to "mode ON" |
| | then test for: |
| | CP - geo at t "mode on 1" = D to CP1 note: distance to CP centerpoint |
| | CP - geo at t "mode on 2" = D to CP2 etc. |
| | If (D to CP 1) < (D to CP2) < (D to CP3) .... then "movement" detected |

Equation 2A is a point to point velocity equation wherein a velocity at each acquired geographic point over a certain time span is calculated. The velocity over t1 to t2 is obtained and compared with the velocity of t2 to t3. If the velocity at various time spans is increasing such as the velocity between time t1 and t2 and the velocity between times t2 and t3 and the velocity times t3 and t4 and the velocity between times t4 and t5 is increasing, then step 68 determines that the GPS-enabled device is showing "movement" as noted in step 70. The YES branched is then taken from step 70.

Equation 2B is an interval velocity calculation which looks at the velocity between two non sequential time data points. These non sequential data points are called d-interval-1 and d-interval-2. The distance between these two intervals is calculated and is divided by the time period of the time stamp for location at t1 as compared with the time stamp for a time at the predetermined interval t2. If the velocity is greater than a velocity threshold value, then "movement" is detected in step 70.

In Equation 2C, a center point data is utilized for the sequential time intervals and for the interval velocity shown in Equations 2A and 2B.

Equation 2D uses the center point data for a time period prior to "mode ON." Data from antecedent time t1, t2, t3, t4 (antecedent to "mode ON") is gathered prior to the time when the system detected the "idle to movement" ON. A test is made from the center point of that antecedent data to when the geographic data for the "mode ON" is detected. The resultant is a distance currently detected as compared with the previous center point distance CP1. The next calculation determines the center point of the current data group (not the antecedent data group) to determine the distance between the first center point and the post "mode on" data. The resultant is the distance to CP2. If the distances from the first center point as compared to the distance to the second center point are increasing then movement is detected.

Returning to FIG. 4, if movement is detected in step 70, the YES branch is taken and the system executes step 72 which turns ON the "movement mode" algorithm. Equations 3, 3A, 3B and 3C show examples of a "movement mode" algorithm. Step 74 enables processing of one or more of these algorithms to determine whether the GPS-enabled device is being moved.

In Equation 3, the velocity is calculated between two times, t1 and t2. A threshold is used in the system (set) and the system determines whether the velocity exceeds a human walking speed threshold. The human walking is typically 5 kph (3 mph). If the velocity at two time periods t1 through t2, t2 to t3, is greater than the human walking speed, the "movement mode" is turn ON. In Equation 3A, a further velocity check is conducted by the system. If the GPS-enabled device is moving faster than 16 kph (10 mph), the system is still determining that the GPS-enabled device is moving.

Equation 3B is a determination of two velocities over two different time frames. The velocity at t1 through t2 as compared to the velocity at t3 trough t4. Further, if a differences in velocities exceed a threshold V differential, then the system continues to determine that the "movement mode" is ON for that particular GPS-enabled device. Equation 3C utilizes algorithm with distance traveled data per a predetermined time frame and also and antecedent distance and velocity and a post-modal distance and velocity, all as compared with a more recent time interval.

Several algorithms could be utilized and the equations presented herein are only examples. If the GPS is still moving, the YES branch is taken and the system in step 76 sets the "movement to idle" algorithm ON. The "movement to idle" algorithm is the inverse of the "idle to movement" algorithm executed in connection with step 68, that is, Equation 2. In step 78, this inverse algorithm is used for the "movement to idle test." If no "movement to idle" outcome is noted by the equations and algorithms, the step continues to gather data as noted in step 79.

If the YES, branch is taken indicating that the GPS device is slowing to an idle, the system executes steps 80 which tests for the "idle" mode. This is noted in Equation 1 above.

It should be noted that since the system has data indicating the location of Customer A location A-1 as compared to customer B location B-1, and the system further continuously accepts GPS signal data from the smartphone devices carried by the task person, it is easy to determine when the task person arrives at customer location A-1 as compared to customer location B-1. A simple match achieves this "at location" test. However, the system also computes on a regular basis the travel time from location TP-6a, which is the initial location of smartphone 7, to customer location A-1. This travel time is logged into either the summary of the assigned work order table in FIG. 3C as time traveled field (which may require an additional field in Table 3C). The time traveled field may also be utilized in FIG. 3P as the location geo tracker. Additionally, the actual distance (approximated by the GPS signals) traveled by the task person 6 from the location TP-6a to location A-1 can be calculated. As used herein "distance" or "actual distance" refers to an approximate distance traveled by the GPS-enabled device because the GPS signal sometimes meanders and is not 100% accurate. These distance calculations are provided by other algorithms known to persons of ordinary skills in the art. Since the system also detects "time at idle" position, a "time on site" calculation can be calculated from the idle data. The time on site is simply the time in the idle mode after smartphone 7 GPS location matches customer location A-1. The idle time is accumulated and calculated and ultimately posted in work order menu FIG. 3C and in location geo tracker display FIG. 3P when the smartphone leaves the "idle mode" state and enters the "idle to movement" state. However, the true test of when the smartphone and the task person leaves customer location A-1 occurs after the customer location match and after the "idle to movement mode" is detected and when the smartphone is in the "movement" mode. When this "movement" mode is detected, the system notes the time and calculates the "time on the site" and fills the data field in FIG. 3C as well as the time on site field in FIG. 3P.

As a result, the billing and accounting or back office program for the present system can calculate the profit and loss ratio for the projected service time at location A-1 or the amount of face time the task person 6 spent at customer location A-1. Further, an analysis can be made of the travel time from tp6a to location A-1. Since the billing cycle and the travel time and the time on site is all integrated ultimately into the profit margin of the business, this information is of high value to both the managers, the team members, and the system administrator.

Figure 5:
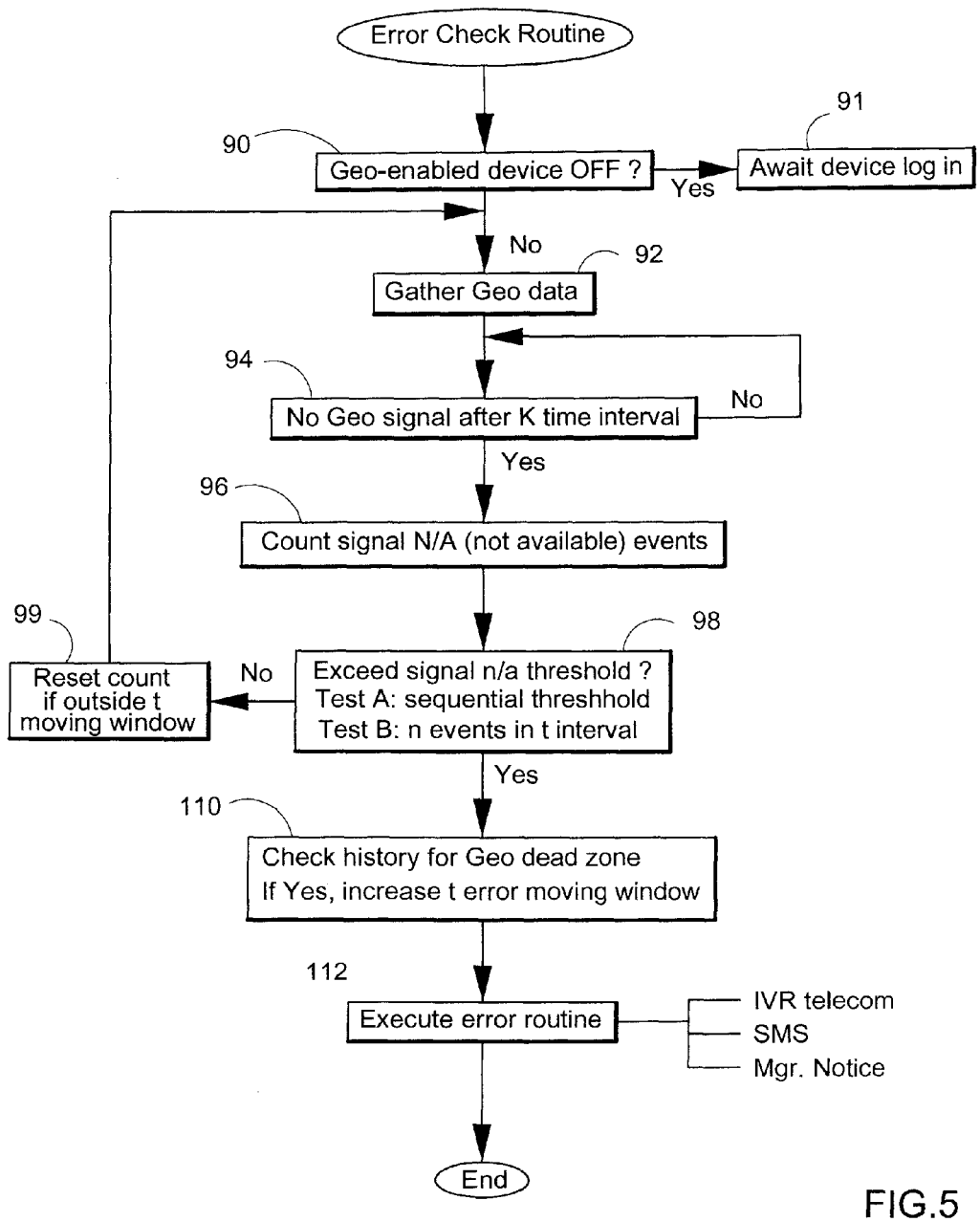
FIG. 5 diagrammatically illustrates a flowchart showing one implementation of the error checking routine.

There are certain errors involved in capturing this GPS data from GPS-enabled devices. For example, the GPS data acquisition can be interrupted by a poor telecommunications channel, a lack of cell phone coverage, and a lack of GPS signal reception by the smartphone or GPS-enabled device. Therefore, FIG. 5 shows an error checking routine which is an example of at least one method to recognize these errors. In step 90, a determination is made whether the geo enabled device if OFF. If YES, the system waits until the device logs-in in step 91. If NO, meaning that the geo enabled device is ON and logged in, the system executes step 92 which gathers the geographic time stamp location data from the smartphone. In step 94 the system determines whether there has been no GPS signal after a certain time interval K. If NO, the system loops back to gather step 92. If YES, the system executes step 96 which counts the signal "not available" (n/a) time events. In a 6 second cycle, three n/a counts are logged in a 20 second time interval. In step 98 the system determines whether the n/a GPS count exceeds a threshold value. One error is whether sequential acquisition times t1, t2, t3 have been missed (three n/a counts in 20 sec). In the present working embodiment, the system gathers GPS signal every 6 seconds. If the signal is not received by the process server for 1 minute, this is 10 unit time interval, equal to 10 n/a counts. Test A in step 98 may be met that if the GPS signal has not received four 10 sampling times (represented 1 minute) the YES branch is taken. Test B in step 98 determines whether there has been an n number of n/a events within a certain time interval T-error. In other words, if there are 6 non available GPS signal events within a five minute T-error time period, the system is programmed to generate a YES indicator from step 98. If the signal n/a threshold has not been met, the NO branch is taken and in step 99 the system resets the n/a signal count if the oldest n/a signal count falls outside of the moving time interval window. The system returns to gather geo data step 92.

If the GPS n/a signal threshold has been exceeded, the YES branch is taken from step 98 and the system in step 110 checks the history of all of the GPS-enabled device to determine whether the current or last confirmed GPS signal is within a "geo dead zone." If a history for a plurality of GPS-enabled devices shows that there is a geographic dead zone in or near the current location, the YES branch is taken and the time interval is expanded for the n/a threshold task 98. By expanding the time threshold in step 98, the system looks for a greater number of n/a events to better track the current GPS location. If history does not indicate a geographic GPS dead zone, the system executes step 112 which institutes an error routine.

The error routine may involve an interactive voice response or IVR telephone call to the smartphone 7 of task person 6, a short message service sms to smartphone 7 or a notice to a manager A32. Other error routines could be utilized.

Once an error is noted, the type of error and the degree of Sys. Op. notification should be posted in Table FIG. 3B. In this manner, the type of error and any corrective steps may be taken by the Sys. Op. manager or other supervisor.

Figure 6:
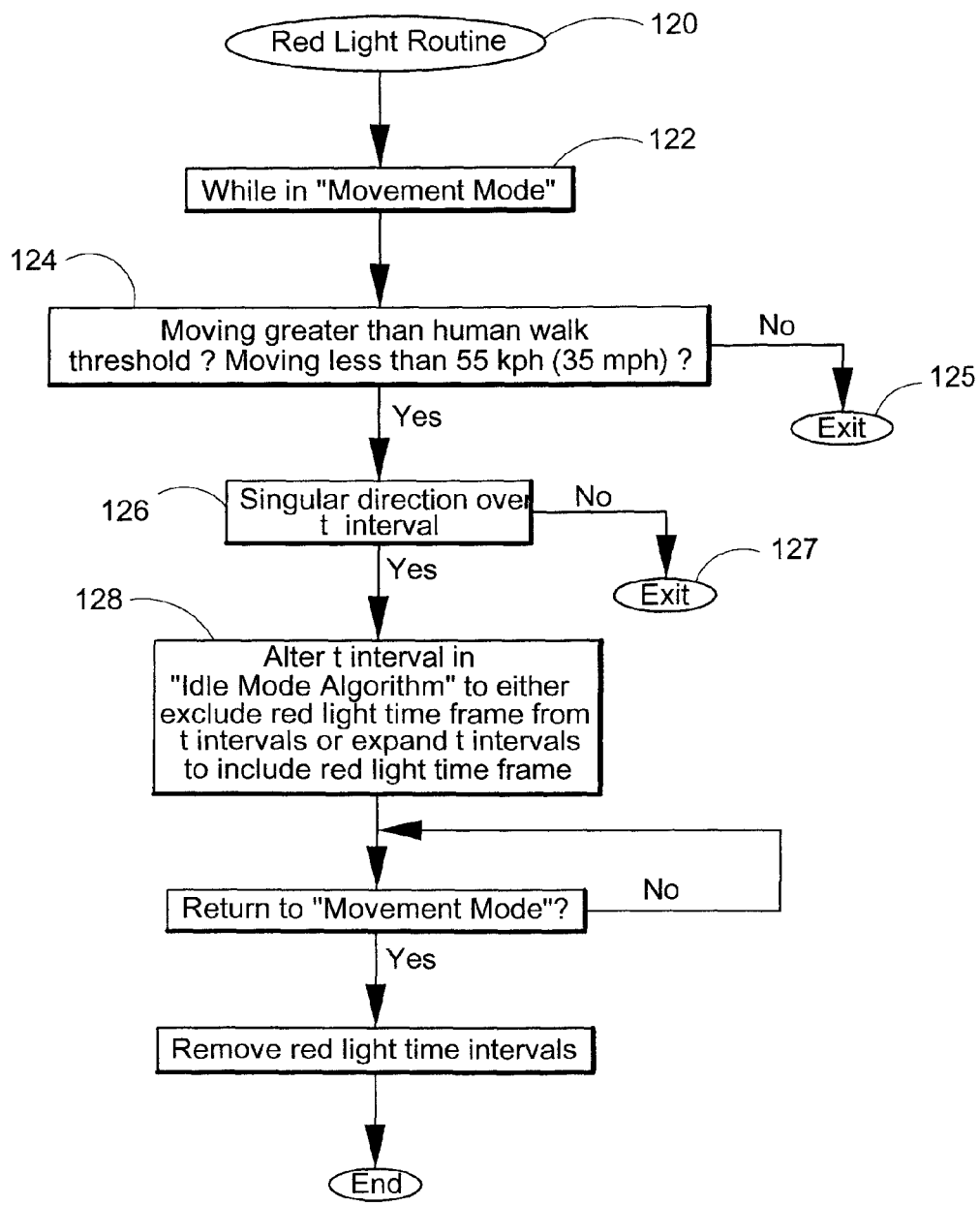
FIG. 6 diagrammatically illustrates a example of a flowchart for a red light routine which alters the idle mode algorithm.

FIG. 6 diagrammatically illustrates a red light routine 120 which supplements the idle mode routine. In step 122, a determination is made that the system and the monitor GPS device is in a movement mode. In step 124, a determination is made whether the GPS device is moving greater than a human walk threshold and is moving less than 55 kph (35 mph). If not, the system exist the program at step 125. The reason for testing for "greater than walk" speed and the "less than 55 kph" is that in city traffic, the typical vehicle speed between traffic lights on a city road is greater than a human walk speed (5 kph) and is less than the 55 kph speed. If YES, the system executes step 126 which determines whether the GPS device is moving in a singular direction over a certain t time interval. This is a directional test of sequential data. If not, the system executes at step 137. If YES, the system executes step 128 which alters the time intervals in the idle mode algorithm to either exclude red light time frame from the time interval or expand the time intervals to include the red light time frame. In other words, if the task person 6 is stopped at a red light, the system adapts to expand the time frame to determine when the system and the GPS device is in idle mode. The red light time frame can be obtained by the local jurisdiction based on traffic patterns.

Record and Visualize Type, Key Times, Duration of Geo Data

The present invention relates to a system, a method and a computer program to analyze time stamp location data or GPS signal data, produce movement and idle segments for the task person (user) or GPS-enabled machine or equipment, transform the series of GPS signal data into time-on-site indicator data, and record and visualize the type, beginning time, ending time and duration of each movement segment from the set of time stamped location data. The resulting chronological output is based on the traditional time sheet format except that each individual time block corresponds to a movement segment (Idle, Moving . . . ). Each block also has an associated link to visualize the corresponding details (type, duration, beginning time, end time, distance (if applicable) . . . ). This method can also be used to visualize the appointments in conjunction with the corresponding movement segments.

Figure 7A:
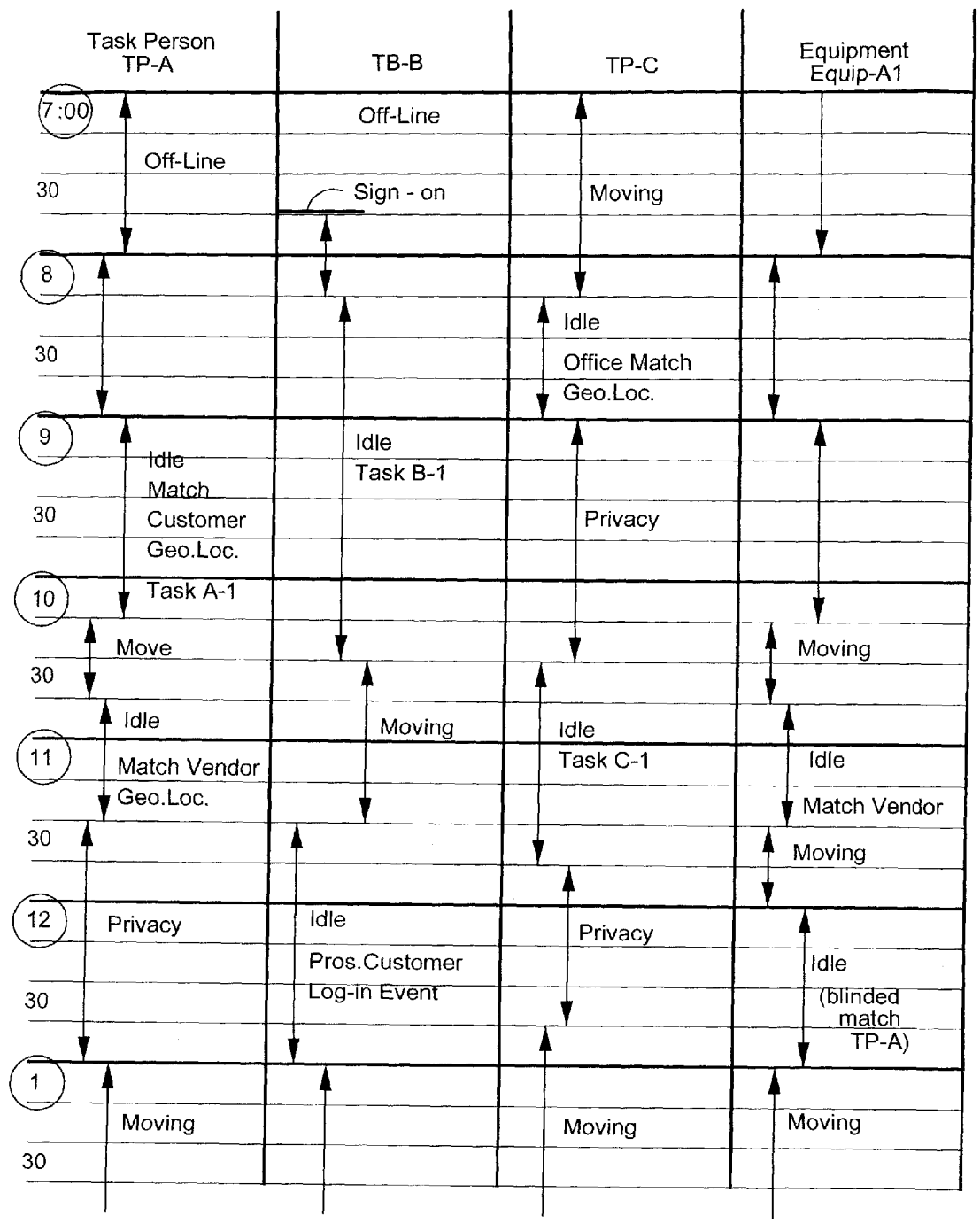
FIG. 7A diagrammatically illustrates a example of a daily calendar showing the type of status of GPS-enabled personnel and equipment.

FIG. 7A diagrammatically illustrates a time segmented and display daily calendar for three task persons, TP-A, TP-B and TP-C as well as a time segmented display for equipment Equip-A1. Referring to task person TP-A, only part of the daily time segmented display is shown. Reference to time blocks are keyed to the start time. For example, with respect to task person TP-A, the "off-line" time block from 7 AM to 8 AM is referred to herein "time block 7 AM." The daily time sheet or time segmented display in FIG. 7A is generally compiled in real time and is displayed to a manager or other person having control access to the system. The day calendar initially appears with appointments as shown in FIG. 7B. Accordingly, at the beginning of the day, prior to obtaining any GPS time stamp location data from the GPS-enabled devices, the daily time planner for task person TP-A shows, at the 9 AM time block, a scheduled task TP-A1 at geo location task A-1. Also, the task person TP-A has previously logged into the system and asserted a privacy block which blocks or masks the geo location signal and the status signals (idle or move) for the time block 12 noon to 1 PM. In contrast to the scheduled 9 AM appointment at task situs A-1, task person TP-B has not been assigned any scheduled tasks for that day. Accordingly, task person TP-B has a note "manager not assigned." Similarly, in connection with equipment A1, there is a manager note "not assigned." With respect to task person TP-C, there are no entries prior to initiating the real time acquisition of geo location data.

Returning to FIG. 7A, and with respect to TP-A, the system is offline during the 7 AM time block. This may be due to the fact that task person TP-A has disabled his or her GPS enabled device. The system could also be turned OFF during 7 AM time block and not made active until the 8 AM time block. The system is flexible enough such that with respect to task person TP-B, that person signs into the system at time block 7:30 AM. At that point, the system notes that the GPS enabled device carried by TP-B, whether a cell phone, table computer or electronic device with a GPS enabled signal, is tracked by the system.

Returning to task person TP-A, at the 8 AM time block, the system notes that the task person is moving. As discussed earlier, the system can detect an idle condition based upon certain algorithms. With respect to the record and visualize the type, time and duration of a moving segment, the key element is to determine whether the idle is ON, indicating a certain status indicator of the GPS signal, in comparison to the movement ON status indicator for that same GPS enabled device. As indicated earlier, the idle ON status indicator can be generated based upon a comparison of monitoring at least one earlier position of the GPS enabled device as compared with the presently acquired GPS location data. A distance threshold is generally used and when a distance threshold is not exceeded, the idle ON status is recorded. However, a movement ON status indicator is provided, as discussed in more detail above, when the present GPS location data is compared to at least one earlier GPS location and a distance threshold is exceeded, a velocity threshold is exceeded or change in velocity threshold is exceeded. Of course, when the idle ON status indicator is ON, the GPS enabled device is relatively located within a single territorial range. When the movement ON status indicator is generated, the idle ON status indicator is turned OFF. This occurs with respect to task person TP-A in time block 9 AM. Further, the system has determined that when the idle ON status indicator was generated, the system checks the geographic location of the task A1 and determines whether that geo location substantially matches the present GPS location of the GPS enabled device carried or utilized by task person TP-A. At time block 10:15 AM, person TP-A moves thereby indicating and generating a movement ON status indicator. At time block 10:45 AM, the system detects that the person's GPS enabled device has indicated an idle ON status indicator. The geo location at time block 10:45 AM substantially matches the same geo location of a vendor. In other words, the unique task data collection which includes task person data, task situs location data, projected time of arrival data, time on site estimated data, and task assignment data, may also include information regarding required or necessary supplies or equipment to be purchased by task person TP-A in order to fulfil a customer request.

At time block 11:30 AM, task person TP-A has turned ON a privacy event. As noted earlier, person TP-A has a pre-set privacy block at 12 noon as indicated in FIG. 7B. However, in FIG. 7A, person TP-A has turned ON a privacy event data which includes a privacy start time. The privacy ON request is made in real time whereas the block at 12 noon was pre-programmed by person TP-A. This privacy start time at 11:30 AM runs into the pre-set privacy block time beginning at 12 noon. The privacy event data ends as pre-programmed at 1 PM.

Alternatively, person TP-A could turn OFF the privacy event data indicating an end of privacy time for that event. At 1 PM, person TP-A is again on the move and the system generates a movement ON status indicator.

Person TP-B is initially off line at time block 7 AM and then signs into the system at 7:30 AM. At 8:15 AM, the system detects an idle ON status and that status is posted on the daily report. The idle/movement status is posted and published on the daily calendar report substantially in real time. "Substantially in real time" accounts for processing time that may be lost from the actual acquisition of the GPS time stamp data as compared with processing and publication of that data. As discussed herein, there are several delay processes that affect the system prior to publishing or posting the daily activities of a task person. At time 8:30 AM, person TP-B has the idle ON status indicator lit and that person is accomplishing a task at location B-1. At 10:30 AM, person TP-B is moving. At 11:30 AM, person TP-B is subject to an idle ON status indicator. As discussed later, the system may generate a communication session with person TP-B inquiring why that person has stopped. Person TP-B may then respond to the system communication by noting that person TP-B is discussing services or goods with a prospective customer. Therefore, this is identified as an "log in event" in the display. In other words, the display and system is flexible enough such that task persons can post short notes describing his or her activities in the daily log. This real time online posting of current task data is helpful to managers and system operators.

Task person TP-C first arrives at the office at 8:15 AM. The office task person and the system notes that person TP-C is in the office because the geographic location of the office substantially matches the geographic location of the GPS enabled device carried by person TP-C. That person at time block 9 AM has requested a privacy block in substantially real time. The privacy block first runs from 10:30 and then expires at 11:30. The system may be pre-set to grant a one hour privacy block automatically to any worker that requests such a block. After the expiration of that pre-set one hour privacy block, the person must request a second privacy event. At 11:30 AM, person TP-C has requested that supplemental privacy block. At 12:45 PM, person TP-C has turned OFF the privacy event data indicating an end of privacy time.

The system is also flexible enough to track GPS enabled equipment. In the far right column of FIG. 7A, equipment A1 is first idle between the time block 7 AM to 8 AM. The GPS location of equipment A1 substantially matches the GPS location of the equipment yard for the system operator. At 8 AM, the system notes that equipment A1 has a movement ON status indicator. The system then confirms that equipment A1 is assigned to the scheduled unique task of TP-A by accessing the unique task data collection. If the task data collection does not list equipment A1, a communication session may be opened with the task person handling equipment A1 or, a manager for that task person may be contacted. At time block 9 AM, equipment A1 is in the idle ON status which matches the geographic location of task A-1 utilized by task person TP-A. In this manner, the system may not engage in an initial communication session with one or more task persons or managers but may wait 3-4 hours to confirm if the equipment becomes idle at a consumer geographic location. In this manner, the system can automatically populate the unique task data collection and potentially account for the use of equipment A1 for task A1 accomplished by task person TP-A. The equipment is moving at time block 10:15 AM and then becomes idle at time block 10:30 AM. At time block 11:30 AM, the system is movement ON status. Further, the system at time block 12 noon indicates that equipment A1 is in an idle ON status. However, since the task person TP-A has previously privacy blocked that time frame, the system automatically blocks the idle location of equipment A1.

Figure 8A:
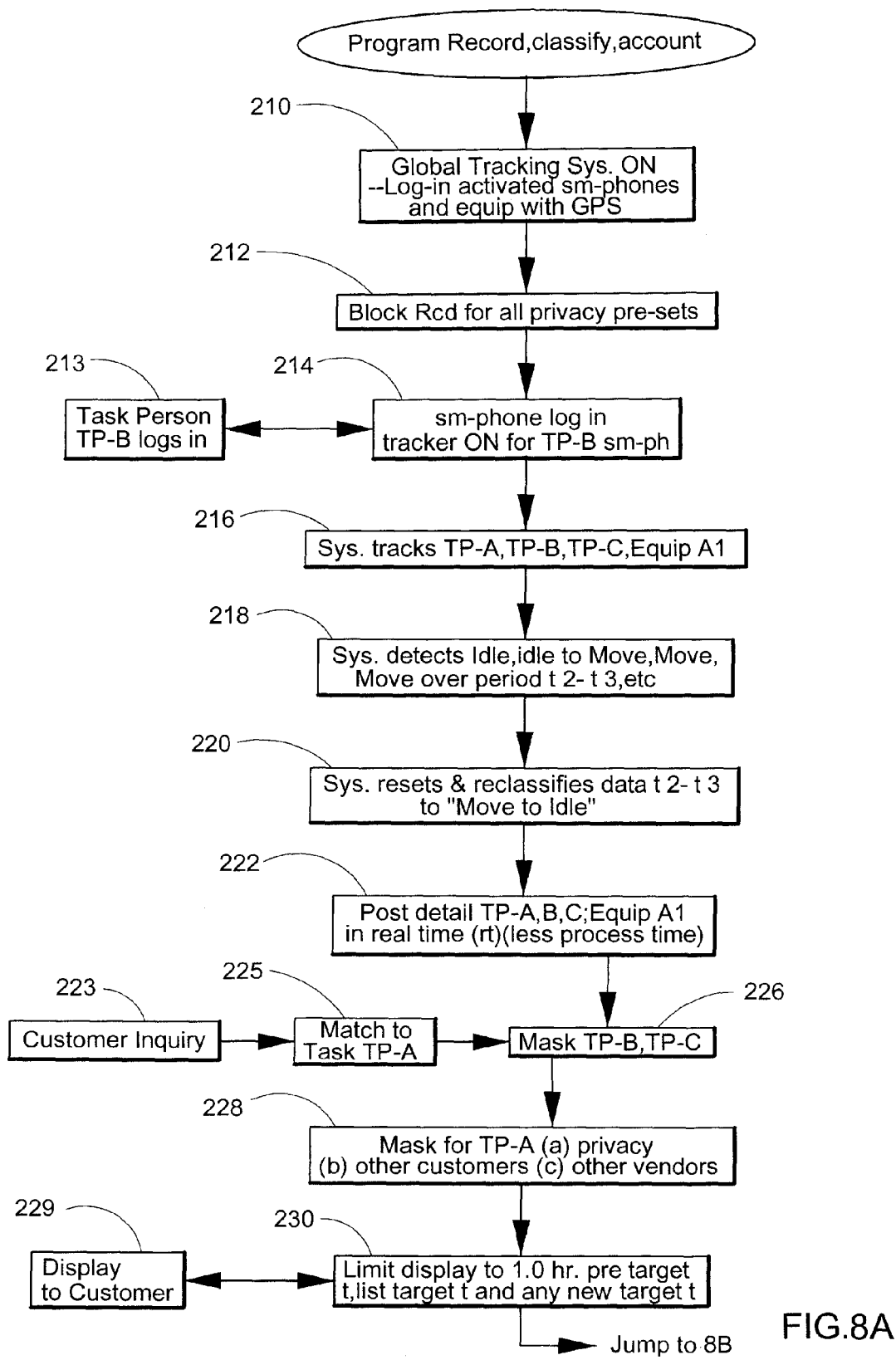
FIGS. 8A and 8B diagrammatically illustrate a process for recording, classifying and accounting for time and travel and geographic location of task persons, GPS-enabled personnel and equipment.
Figure 8B:
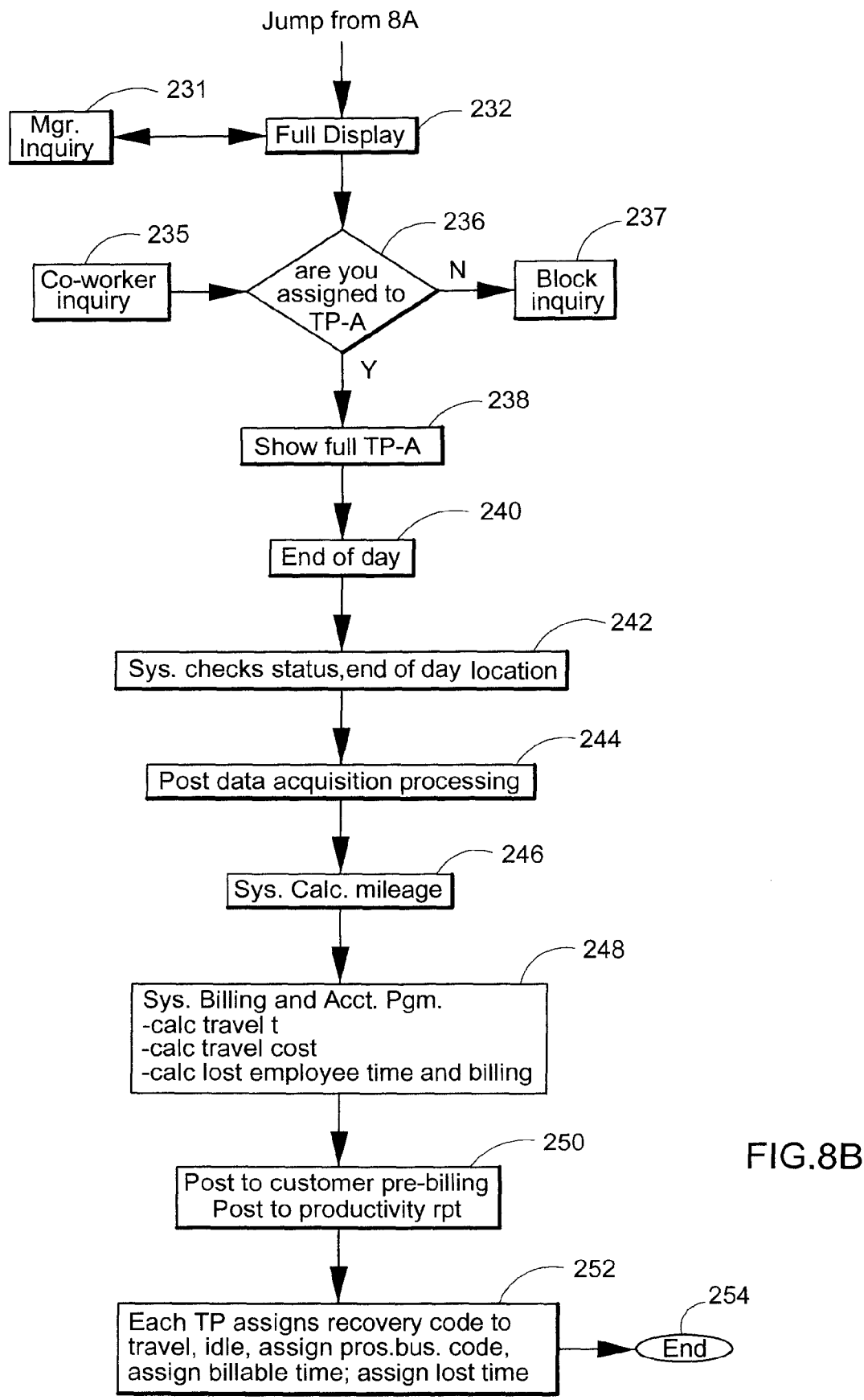

FIGS. 8A and 8B diagrammatically illustrate the process flowchart for the record, classify and account program. In step 210, the global tracking system is turn ON. Some GPS enabled devices will automatically login to the system. Other GPS devices will be logged into the system by task persons and managers selecting applications on their cell phones. Step 210 logs in the activated smart phones and equipment carrying GPS units. Step 212 blocks any records for all privacy block preset. As discussed earlier, the system enables the task person and/or the manager to set privacy pre-blocks which mask the geo location of the person carrying the GPS enabled device. In step 213, task person TP-B logs into the system. In step 214 the smart phone login is noted by the system and the tracker is turn ON for the TP-B smart phone. In step 216, the system tracks the GPS enabled devices carried by TP-A, TP-B, TP-C and equipment A1. In step 218, the system detects the idle, idle to move, move, and move to idle over period t2 through t3 as well as the idle. These items are discussed earlier. In step 220, the system resets and reclassifies data in time frame t2 through t3 the move to idle condition. In other words, the system can detect with reasonable accuracy an idle condition and can detect with reasonable accuracy a movement condition. However, in certain situations, for example in traffic jams, it is difficult to detect the exact time of the end of an idle condition and the beginning of a true movement condition. Therefore, in step 220, the system reclassifies the "type" or status data for time period t2 through t3.

In step 222, the system posts or publishes the detail of TP-A, B, C and each equipment A1. This is done in substantially real time (rt), taking into account the data process time and the reclassification time discussed above in step 220.

In step 223, a customer of the system operator (or user of the system) makes a request. In step 225, the customer's inquiry is matched to a particular task which is assigned to TP-A. In step 226, the system masks the daily time and movement status of persons TP-B and TP-C. In step 228, the system also masks for person TP-A any privacy block times as well as any time at customers other than the requesting customer. Other vendor data is also blocked for the customer inquiry. In step 230, the system publishes or displays, to the inquiring party a predetermined time frame prior to the projected time of arrival data. Masked or blocked data is not published. In FIG. 8A, this projected time of arrival data is called a "target time." The earlier published time frame is the "pre-target time." In other words, the system displays or publishes a one hour window prior to the target or scheduled time of arrival on site as well as any new target time. In step 229, the system web site displays this partly redacted display to the customer. In this manner, the customer is provided with relatively accurate on time data and the display notes any delays caused by traffic or other issues. The flowchart then jumps to 8B.

FIG. 8B shows in step 232 that a manager has made an inquiry in step 231. The system provides a full display of the real time move idle and status record to the manager. In step 236, a decision block responds to a co-worker inquiry in step 235. The system determines if the co-worker is assigned to or otherwise associated with person TP-A. If not, the NO branch is taken and the system blocks the inquiry in step 237. If the co-worker is associated with person TP-A (possibly as an assigned co-worker for task A-1) or a relative or a supervisor of person TP-A, the YES branch leads to step 238 which shows the full daily time and location and travel schedule for TP-A to the inquiring party. In step 240, an end of day indicator is noted. In step 242, the system checks the status and the end of day location for all GPS enabled equipment. For example, if a task person is generally in the office, the GPS signal may show movement away from the office location. With respect to equipment, that equipment if assigned to the operator's yard, the GPS location would match that geo location for the yard.

In step 224, the system notes that certain processing steps occur after the data acquisition. In step 248, the system calculates the mileage of each person and the equipment. The mileage could be calculated based on a time-based factor multiplied by a number resulting in a monetary value. Alternatively, the geo locations to the customer can be associated with a predetermined geo location such as the geo location of the office. In that manner, a distance-based monetary value is calculated for that unique task data collection. In step 248, the system engages a billing and accounting program. This billing and accounting program calculates the travel time and a monetary value for the travel time, calculates the travel cost, and calculates lost employee time. The billing records and prospective bills are updated and prepared. In step 250, this cost accounting monetized information is posted to a customer pre bill. These are also posted to productivity reports. In 252, each task person assigned to a project may assigned a recovery code to the travel, idle time, prospective business activity and assigned billable time and assigned loss time. In this manner, the managers receive feed back from the task person prior to finalizing the bills being sent to the client. The system ends in step 254.

Figure 9:
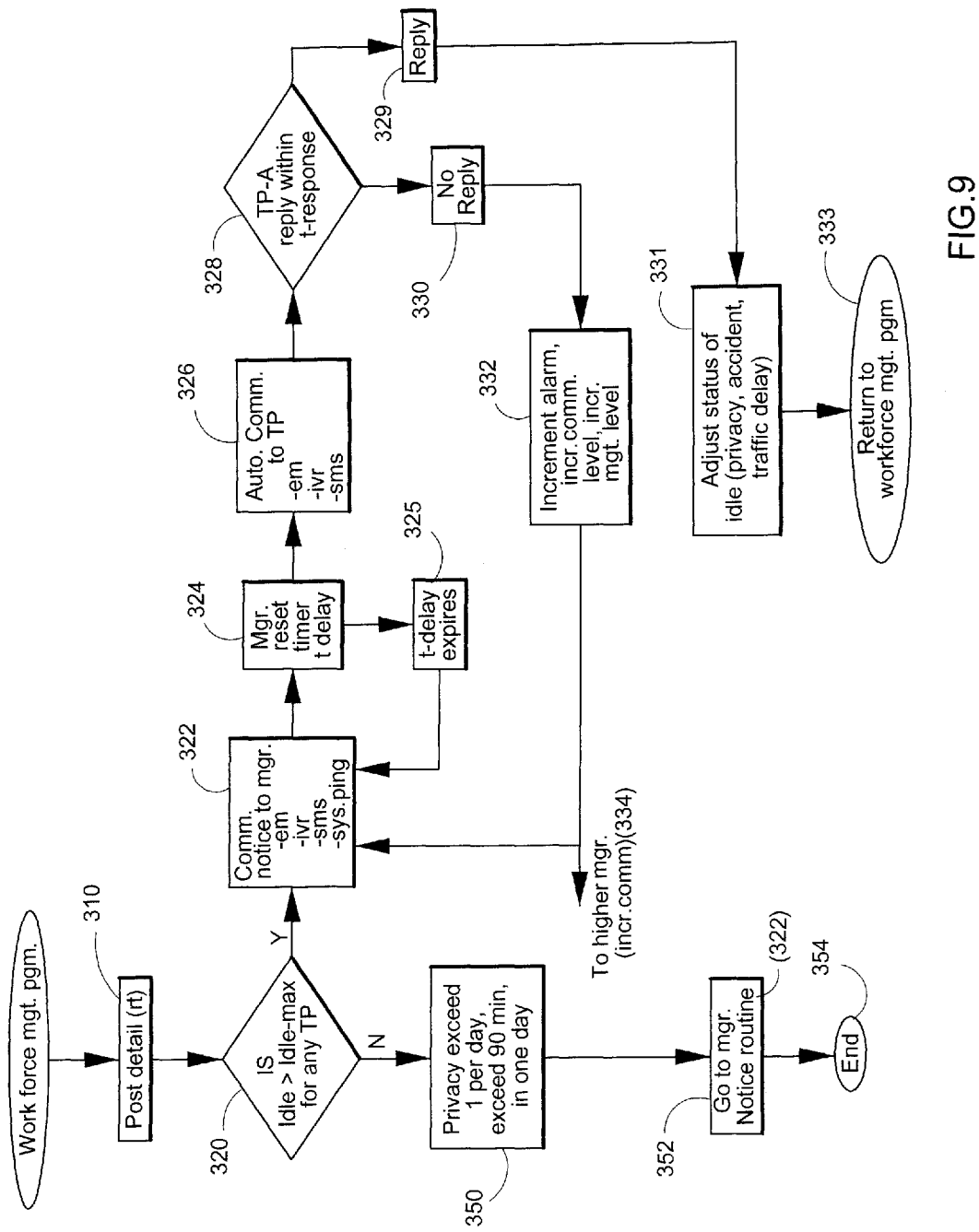
FIG. 9 diagrammatically illustrates a workforce management program for communications sessions, re-classification and confirm/approve/deny approval of events.

In FIG. 9, a work force management program is shown. In step 310, the information is posted in the daily time format in real time. In decision step 320 the system makes the determination about a particular idle time. When idle ON status indicator is active, and the time exceeds a predetermined value, identified as idle-max, certain system events are activated. The idle-max may be unique to a particular task person or may be generally assigned by the system operator. If NO, the system executes step 350 to determine whether a privacy time limit has been exceeded. For example, the system may be preset such that lunch periods for each task person should not exceed one hour. If the idle status ON is active for more than one hour and the task person has either, in real time, activated the privacy block ON or has preset the privacy block (present before the beginning of the day), the system may generate a communication session. The privacy time has exceeded a pre-set limit. In step 350, the system calculates the total amount of privacy block time accrued by a particular person that day. A predetermined threshold such as 90 minutes may be utilized by the system to determine that any and all privacy blocks for that person do not exceed 90 minutes in any one day. If YES, the system triggers management step 352 which is a communications notice routine. The process ends in step 354.

Returning to decision step 320, if the idle time exceeds idle-max or if the manager notice step 352 is activated ON, the YES branch is taken to step 322.

In step 322, a communication session is engaged with the manager. This communication session may start with a small, non intrusive communication event with the manager such as a text (SMS) message or an email. The communications may escalate to include a voice communication with an interactive voice response or IVR. Further, rather than start with an email and then progress to IVR, the system may begin with a text message or sms communication. The highest level of communications may include a system ping turning ON an audio and a visual indicator on the manager's laptop, computer desk or cell phone. The system is flexible enough such that the system operator can adjust the progression and sequence of the communication sessions and the aggressiveness of those communications sessions. In step 324, the manager can reset the time to investigate a potential improper idle or movement status. In step 325, the time delay has expired and the system returns to initiate communication session with manager in step 322. If the manager does not reset the timer in step 324, in step 326, the system automatically communicates with the task person TP. This communication also may be set to progress from a nominal communication up to very aggressive "telephone call" event. A text message or sms may first be sent to the task person. Then an email may be sent to the task person. Finally the task person may be called by the system through an ivr portal. In step 328, the system determines whether the task person TP-A has replied within a certain response time. If YES, the system executes reply block 328 and in step 331 the system adjusts the status of the comm indicator. For example, if the idle ON status indicator is active, the task person may reset it for a privacy block. Potentially, the task person forgot that he or she was going to lunch and should have activated the privacy block. Otherwise, the task person may indicate that an accident during transit occurred or that the idle delay is subject to a traffic delay. In step 333, the system returns to the work force manager program.

Returning to decision block 328, if no reply is noted by the system in step 330, in step 332 the system increments the alarm, increments the communication session with the task person and increments communications with the manager, and potentially increments the management level. For example, a supervisor may first be notified and then, if the incident is not corrected or altered, the plant manager or site manager may be notified as noted in step 334.

As discussed above, the system is highly flexible for various tasks and privacy blocks.

The following Tables A-E provide additional information and processes which show the high degree of flexible that the system operator and user of the system can employ. The information in Tables A-E are provided as examples only and these Tables may be mixed and matched depending upon the flexibility of the worker and management style.

TABLE A

Real Time Reset "Type" for Privacy Time Block

| | |
|---|---|
| 1. | Identify general comm clearance time-based rules for Privacy, for example ("e.g.") "comm set ON" 9AM to 11:30 AM and 1:30 PM to 5 PM |
| 2. | Identify general comm rules length of Privacy within key work periods (9 AM to 11:30 AM and 1:30 PM to 5 PM), e.g., comm clearance when Privacy ON for more than 30 min. |
| 3. | $1^{st}$ comm notice: to Task Person A: sms: "Please confirm Privacy Blocker ON" |
| 4. | Sys. await response from Task Person A. Wait time is 5 min. |
| 5. | If no response, $2^{nd}$ comm notice of TP-A: sms and IVR: "$2^{nd}$ Notice: Please confirm Privacy Blocker ON". |
| 5a. | Sys. await response from Task Person A. Wait time is 5 min. |
| 5b. | $1^{st}$ Mgr. comm notice: to Mgr of Task Person A: sms: "Confirm TP-A Privacy Blocker ON. Sys seeks approval/non-approval." |
| 5c. | Sys. await response from Mgr. for Task Person A. Wait time is 5 min. |
| 5d. | Escalate comm. to TP-A and to Mgr. for TP-A: e.g., $1^{st}$ sms, $2^{nd}$ IVR, $3^{rd}$ email, $4^{th}$ comm to next level higher Mgr. |
| 6. | If TP-A response submitted to Step 5: (i) set privacy block ON for either 30 min (or other pre-set time block) or (ii) set privacy block ON for period suggested by TP-A. |
| 7. | Reset the "Type" label on the time block to "privacy." Display re-set "Type" on the sys daily calendar. |

TABLE A-continued

Real Time Reset "Type" for Privacy Time Block

| | |
|---|---|
| 8. | Increment total "Daily Privacy Timer" for TP-A. |
| 9. | Execute Workforce Management Program as needed |

With respect to Table A, this process flow shows that a task person can reset any particular status condition for a privacy time block. In Table A, step 1, the system has preset rules which indicates that a privacy can only be activated during communications set ON during key business hours and all privacy requests need confirmation by management. The confirmation is enabled by "comm set ON" noting that managers are involved in the communications sessions. The "comm set ON" in the Tables refer to a system ON activation of the message and communications routine generally shown in FIG. 9. A "comm OFF" turns OFF the managerial "confirmation required" pathways. In Table A, when the comm is set OFF (outside or beyond the key work periods), no managerial approval is needed. During these key work periods, a manager's approval is needed for a privacy block. In other words, if a worker wants to set a privacy block at anytime between 11:30 AM and 1:30 PM, there is no need for the system to contact the manager or otherwise (no comm necessary). In Table A, step 2, there are general communications rules regarding the length of any privacy block within the key work periods. Those key work periods are 9 AM to 11:30 AM and 1:30 PM to 5 PM. For example, the system can be preprogrammed such that the manager or supervisor must clear a privacy ON block for anything greater than 30 minutes within that key work period. In non-key work periods, the general comm rules may permit the task person to block 90 minutes of privacy. In Table A, steps 3, 4, 5 and 5a relate an increasing progression of communications session with the task person based upon excessive idle status ON. In step 5b, managers are given a communications notice as well as a reminder to task person A. In step 5b, the system seeks approval of the privacy block from the manager. Steps 5d, 6, 7, 8 and 9 discuss escalating the communications and resetting the privacy block and incrementing the daily privacy timer for task person TP-A.

TABLE B

Real Time Reset "Type" for Idle Time Block - TP Office Worker

| | |
|---|---|
| 1. | Identify general comm clearance time-based rules for Idle, e.g., "comm set IDLE ON - Office Location" during key periods 9 AM to 11:30 AM and 1:30 PM to 5 PM |
| 2. | Identify general comm rules as a geo-location range for IDLE-ON-OFFICE within key work periods (9 AM to 11:30 AM and 1:30 PM to 5 PM), e.g., comm clearance when geo-location for IDLE-ON-OFFICE exceeds detected geo-location for more than 10 min. |
| 3. | $1^{st}$ comm notice: to Task Person A: sms: "Please confirm In-Office Status." |
| 4. | Sys. await response from Task Person A. Wait time is 5 min. |
| 5. | If no response, $2^{nd}$ comm notice of TP-A: sms and IVR: "$2^{nd}$ Notice: Please confirm In-Office Status." |
| 5a. | Sys. await response from Task Person A. Wait time is 5 min. |
| 5b. | $1^{st}$ Mgr. comm notice: to Mgr of Task Person A: sms: "Confirm TP-A In-Office Status. Sys seeks approval/non-approval." |
| 5c. | $1^{st}$ Receptionist call comm notice: to Office Receptionist of Task Person A: sms: "Confirm TP-A In-Office Status. Sys seeks confirmation." |
| 5d. | Sys. await response from Mgr. for Task Person A. Wait time is 5 min. |
| 5e. | Sys. await response from Receptionist for Task Person A. Wait time is 5 min. |

TABLE B-continued

Real Time Reset "Type" for Idle Time Block - TP Office Worker

| | |
|---|---|
| 5f. | Escalate comm. to TP-A and to Mgr. and Receptionist for TP-A: e.g., 1$^{st}$ sms, 2$^{nd}$ IVR, 3$^{rd}$ email, 4$^{th}$ comm to next level higher Mgr. |
| 6. | If TP-A response submitted to Step 5: (i) set privacy block ON for either 30 min (or other pre-set time block) or (ii) set "Out of Office" Type ON for period reported by TP-A or (iii) set status to "ON Task AA" or status to "ON Vendor Task" or status to "ON Prospective Customer." |
| 7. | Reset the "Type" label on the time block. Display re-set "Type" on the sys daily calendar. |
| 8. | Execute Workforce Management Program as needed |

Table B discusses the situation when the task person generally works in the office. In this situation, the system can be preprogrammed such that if the office worker is not in the office, a status event is triggered depending upon the geo location of the GPS unit carried by the office worker compared with the geo location of the office. Communications are sent to the task person and then to the receptionist (to page the office worker) and then to the manager. Further, the geo location range for "idle ON office" is pre-set for certain time brackets. Therefore, time-based rules are applied and geo location rules are independently applied. See Table B, step 2.

TABLE C

Real Time Reset "Type" for Idle Time Block—TP Traveler

| | |
|---|---|
| 1. | Identify general comm clearance time-based rules for Task Geo-Loc, e.g., "comm set IDLE ON - Task Loc TP-A1" 30 min prior to scheduled appointment plus estimated "time at Loc TP-A1" plus 30 min post. |
| 2. | Identify general comm rules geo-location range for IDLE-Task Loc TP-A1 within key task period (the scheduled task time), e.g., comm clearance when geo-location for IDLE-Task Loc TP-A1 exceeds detected geo-location for more than 10 min. |
| 2alt. | Identify general comm rules geo-location range for IDLE-Task Loc TP-A1 within key task period (the scheduled task time), e.g., comm clearance when geo-location for IDLE-Task Loc TP-A1 exceeds detected geo-location over a spatial predetermined geo-range, e.g., when the TP-A geo-loc exceeds IDLE-Task Loc TP-A1 by more than 500 feet. |
| 3. | 1$^{st}$ comm notice: to Task Person A: sms: "Please confirm Task Loc TP-A1 Status." |
| 4. | Sys. await response from Task Person A. Wait time is 5 min. |
| 5. | If no response, 2$^{nd}$ comm notice of TP-A: sms and IVR: "2$^{nd}$ Notice: Please confirm Task Loc TP-A1 Status." |
| 5a. | Sys. await response from Task Person A. Wait time is 5 min. |
| 5b. | 1$^{st}$ Mgr. comm notice: to Mgr of Task Person A: sms: "Confirm TP-A at Task Loc TP-A1 Status. Sys seeks approval/non-approval." |
| 5c. | Sys. await response from Mgr. for Task Person A. Wait time is 5 min. |
| 5d. | Escalate comm. to TP-A and to Mgr.: e.g., 1$^{st}$ sms, 2$^{nd}$ IVR, 3$^{rd}$ email, 4$^{th}$ comm to next level higher Mgr. |
| 5e. | Sys. check geo-loc of all equipment assigned to TP-A. This Step 5e may be executed earlier, such as with Steps 1, 2, 2alt., 3, etc. |
| 6. | If TP-A response supplied in Step 5: (i) set privacy block ON for either 15 min (or other pre-set time block) or (ii) set "Traffic Delay" Type ON for Non-Idle (Movement) period reported by TP-A or (iii) free-style post sms or IVR converted to text data on TP-A daily calendar |
| 7. | Reset TP-A Task TP-A1 to new scheduled time. Notify customer. |
| 8. | Reset the "Type" label on the time block as needed. Display re-set "Type" on the sys daily calendar. |
| 9. | Execute Workforce Management Program as needed. |

With respect to resetting the type or idle ON status indicator or movement ON status indicator for a traveling task person, Table C provides some functional steps for the system. In Table C, step 1, the system "looks for" the traveling task person 30 minutes prior to geo location of the task A1 as well as 30 minutes after the scheduled time for task at location A1. This is a time-based or temporal rule process. Step 2 applies communication rules to the geographic location range (within 30 miles of task location A01) within the certain key task period (1 hour prior to scheduled time). This is a spatial rule process. If the geo location for the traveling task person exceeds a detected geo location range close to the Task situs for more than 10 minutes, communication rules are applied to communicate with the traveling person. The rules may involve a spatial or distance relationship to the target task location A1. Also the rules may integrate time based rules into the spatial rules and comm session format. In steps 3 to 5d, escalating communications are enabled with the task person and the manager. In step 5e, the system checks the geo location of all equipment assigned to task person TP-A. Of course, step 5e could be conducted earlier in the program. In step 7, the scheduled time for the task is reset and a notification is sent to the customer. This is discussed in the incorporated pending patent application.

TABLE D

Calendar Display

| | |
|---|---|
| 1. | Initial Calendar Display lists proposed travel time (as Movement), Privacy Blocks (e.g., for lunch), and Time-On-Task-Site (listing a scheduled time to arrive on TP-A1 site, and an estimated "time to complete task TP-A1" (sometimes called "Time on Task"). |
| 2. | Day progresses, Sys gathers geo-loc data for geo-enabled TP-A devices and Equipment |
| 3. | TP-A communicates with sys and updates status or type of event, e.g. in traffic, delayed, in privacy block, at vendor-supplier, at customer, in office |
| 4. | In the event the current status-type exceeds a time parameter or a geo-loc parameter, a comm session is initiated with the actor (TP-A), first seeking an update, then escalating into comm sessions with other personnel and activating more intrusive comm sessions with the actor. |
| 5. | When the actor (TP-A) provides an update to status-type, the Daily calendar is supplemented, altered or otherwise annotated for the new status-type. |

Table D relates to the calendar or daily display. In step 1, the initial calendar display lists the proposed travel time as potential movement and lists privacy blocks and time on task site for a particular schedule. This is a typical "scheduling" calendar. In step 2, as the day progresses the online daily calendar is populated with task and travel related data as the system gathers geo location data from geo enabled devices and updates the daily display. The system communicates with the task person and the task person updates the status of the events whether in traffic, delayed, an accident, or under privacy block, at a vendor supplier, at a customer's location, at a prospective customer location, or in the office. In step 4, if the event status exceeds a status type time parameter (a temporal rule) or a geo location distance parameter (a spatial rule), a communications session is initiated with the actor, such as the task person, first seeking an update form the task person and then escalating into communication sessions with other personnel such as managers or co-workers. When the actor or the task person provides an update of the status report, the daily calendar is supplemented, altered or otherwise annotated.

TABLE E

Event - Type Indicator Table traffic delay indicator
vendor assistance indicator
equipment needed indicator
co-worker needed indicator Table E is an event type indicator table. The various indicators could show a traffic delay, an accident, a vendor assistance indicator. This "vendor assistance indicator" may be a task person noting that he or she needs to go to a store to buy supplies or other equipment for a particular task. The task person may also identify "equipment needed" for a particular task and the need to go rent that equipment from a vendor or return to the office for the designated equipment. In certain situations, the task person may require an additional co-worker. All these status type indicators may be integrated into the system.

Accordingly, the system initially provides daily calendar with privacy blocks that may be pre-assigned by management or by the task person. As the day progresses, GPS signals locate the person and determine whether the idle ON status is active or whether the movement ON status is active. When geo locations match customer locations, an indication of task person on site is provided. To account for unexpected delays, communications are established between the task person and the system to identify traffic delays, to provide the task person a real time privacy event, to identify vendor assistance or equipment needed or co-worker needed. These status reports are provisionally classified and potentially published in the time segmented delay. Managerial confirmation may be required for these various events. Further, the system is flexible enough such that the customer is given some information but not all the information. Managerial confirmation is typically required before customer information is released to the customer. All of these events require an end of status time and the system calculates the corresponding duration. In addition, a respective accounting recovery code is assigned to the recorded event and duration. This enables a time-based monetary value to be assigned. Therefore, travel time can be recouped or potentially billed as well as either on a time base monetary value or on a geographic base monetary value.

Record and Visualize Type, Path and Location of GPS-Enabled Persons and Equipment The present invention relates to a system, a method and a computer program to analyze time stamp location data or GPS signal data, produce movement and idle segments for the task person (user) or GPS-enabled machine or equipment, transform the series of GPS signal data into time-on-site indicator data, and record and visualize the type, beginning time, ending time and duration of each movement segment from the set of time stamped location data. The method records and visualizes the type and the path (or position) of each movement segment from the movements of a person, thing, or apparatus associated to a device that records the corresponding geographical locations and time stamps. The resulting geographical and time based output is based on the traditional map/satellite format except that each individual segment correspond to a movement segment (Idle, Moving . . . ) during the selected timeframe. The main view shows the entire path corresponding to the entire set of segments. Each individual segment can be visualized (highlighted path and icon) as well as the corresponding previous segments (non highlighted path). The actual sequence can be shown by manually selecting the corresponding sliders (previous or next segment), entry in the details table or by an automated time based animation. This method can also be used to visualize the appointment(s) location in conjunction with the corresponding movement segments.

Some important features of the visualization of type, path and location of moving segments include the use of a geographical map or satellite overlay or underlayment and time based view where the individual movement and idle segments and their sequence is shown as a set of path indicia and/or position markers. Hyperlink navigation tools for selection of further path, movement and idle segments are provided to the user, manager or system operator. These links to additional details is provided for each segment with a link to the corresponding details page.

Figure 10:
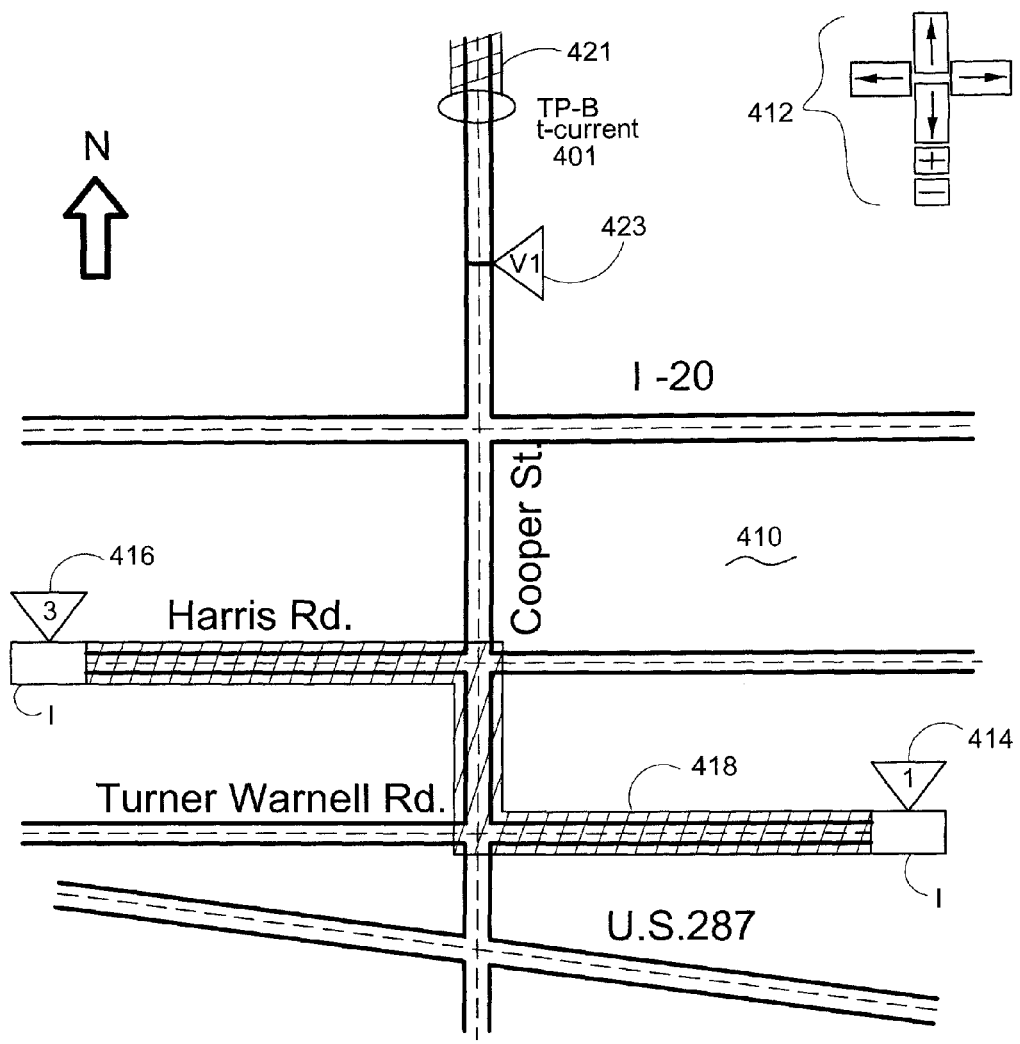
FIG. 10 diagrammatically illustrates a map with idle mode ON indicia and movement ON tracking indicia.

FIG. 10 diagrammatically illustrates a map showing a geographic region which encompasses a location of the idle ON status locations (two idle ON or "I" locations shown) and movement ON tracking indicia locations. The simple map includes a map display 410 and a detailed table display 420. The map display 410 may include highlight functions such that if the user places a mouse or pointer over certain locations on map 410, such as location 1 marked 414, the relevant data and table 420 is highlighted. Similarly, the user by pointing to a row in table 420 such as the row at pointer 1 results in a highlight of point 414 in map region 410. The map 410 also includes hyperlinks to the task assignment details in the task database. These hyperlinks to detailed tables in the database are activated when the user's pointer hovers over and clicks-on task location 4B. The map includes zoom and focus controls as shown in function control area 412. The user can adjust the map to the left or right (west, east) or up or down (north or south) by selecting the appropriate arrow in function control region 412.

As discussed earlier, the GPS system periodically gathers GPS time stamp location data from GPS-enabled devices. These devices are carried by task person or associated with equipment. The system determines when the GPS enabled device is in an idle mode and accordingly generates an idle ON status. This idle ON status is arrived at based upon one or more algorithms. The simple computation measures whether the distance between two GPS located point exceeds or does not exceed a threshold. When the system indicates an idle ON status, the system further generates an idle mode ON indicia which, in FIG. 10, is noted at map location 414 as I. The term "indicia" refers to a visual element on the map. The map is "published" when it is served up by the web server to a requesting party. Table 420 shows that pointer 1 lists under "status" that the GPS enabled device is in an idle mode. The table lists the start time and the stop time for the idle mode and the idle duration (15 min.). Further, table 420 notes a distance or location. For pointer 1 at map location 414, that location corresponds to the office of the system operator. Therefore, the idle mode ON indicia includes various time based information such as start time, end of idle mode time, and duration. The start time, end of idle mode time, and duration may be posted on the map as indicia. Of course, the system is flexible enough to show some or all of this data to the manager or task person. In certain situations, a redacted version of the map may be shown to a requesting customer. This redaction of privacy data and other competitive business data is explained earlier.

The map in region 410 also shows that the GPS enabled device has moved from map location 414 along path 418 to map location 416. Map location 416 is at pointer "3" and an idle indicator I is displayed as the idle mode ON indicia at map location 416. The location and path of the GPS tracked device is shown by the cross hatch in path 418. Path 418 includes travel on Turner Warnell Road, Cooper Street and Harris Road. Table 410 shows that the movement tracking indicia represents 0.5 miles. Also, the start time and end time and duration of that movement ON status is shown in table 420. Therefore, time-based idle and movement data and distance and location (spatial) data is provided by the system.

The movement tracking indicia not only includes location and path but also time based tracking information during the subject time period. In FIG. 10, the subject time includes a time block from 8 AM to 10AM. Therefore, this is a selectable time period. If map 410 is created and active during a present time (in real time), the selectable time period would include the present. For example, with respect to task person TP-B, the current location of that GPS tracked person is shown at map region 401. This current display is identified as t-current in FIG. 10. The movement tracking indicia for person TP-B is shown as path 421.

Accordingly, the system operator or manager could select a predetermined period of time which includes the present; a historic time period which may be the morning of a certain date, the afternoon, or a daily, weekly or monthly time period; a selectable time period; a selectable period that includes the present time (if the current time is 9:30 AM, the selected time may be 7 AM to noon); and sequentially historic time periods (day 1, day 2, day 3, etc.).

Figure 11:
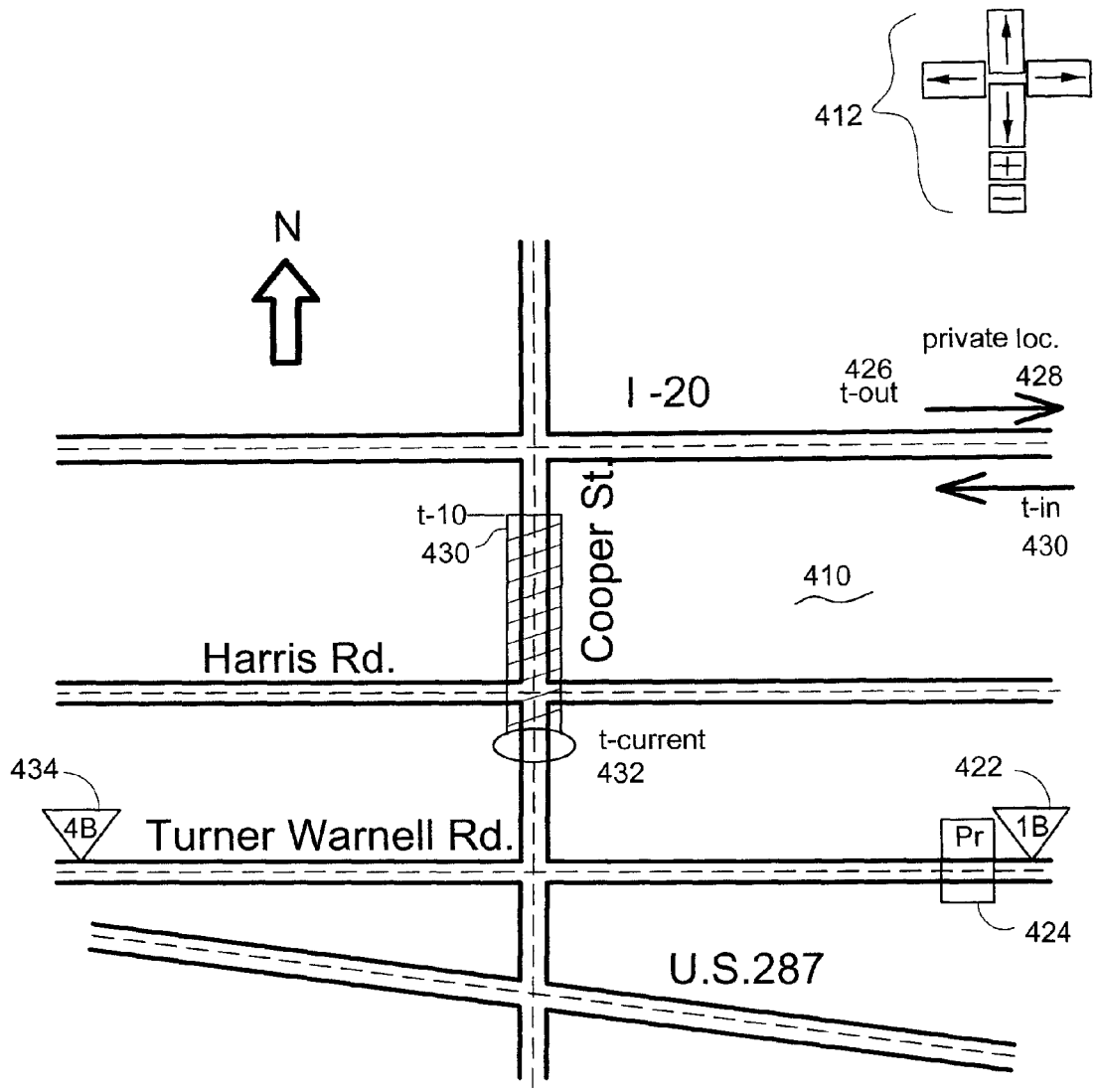
FIG. 11 diagrammatically illustrates a map with idle mode ON indicia and movement tracking indicia which is partially masked due to a privacy block.

FIG. 11 diagrammatically illustrates the operation of a privacy block on map 410. In this illustration, table 420 includes details for task person TP-B. Map location 422 shows location at point 1B. The status at that location is classified as idle. The time data is noted in table 420. However, task person B has turned ON a privacy block as noted by privacy block indicia 424 on the map. Therefore, in table 420, pointers 2B and 3B are blocked out. To show this feature diagrammatically, map 410 shows, at map location 426, that task person B is moving outbound t-out to private location 428. At a later time, task person B is moving inbound at map location 430 as noted by t-in. At time t-10, task person B has turned the privacy block OFF and the system begins the movement tracking indicia at path-location 430. At map location 432, the current location of task person B is noted by the "t-current" indicator. As shown in table 420, at pointer 4B, the system is currently tracking task person B showing that the status of GPS tracking is "in movement" and the distance is shown as being "computed." Of course, in a privacy ON situation, there would be no information regarding map location 426, privacy location 428 and map location 430. However, at time t-10 the map would immediately show the location of task person B since that person has turned the privacy block OFF. This real time presentation is helpful to (a) reassign a person to another task, (b) join two or more co-workers on a single task, and (c) have task person B visit a vendor to purchase supplies for an ongoing task.

Figure 12:
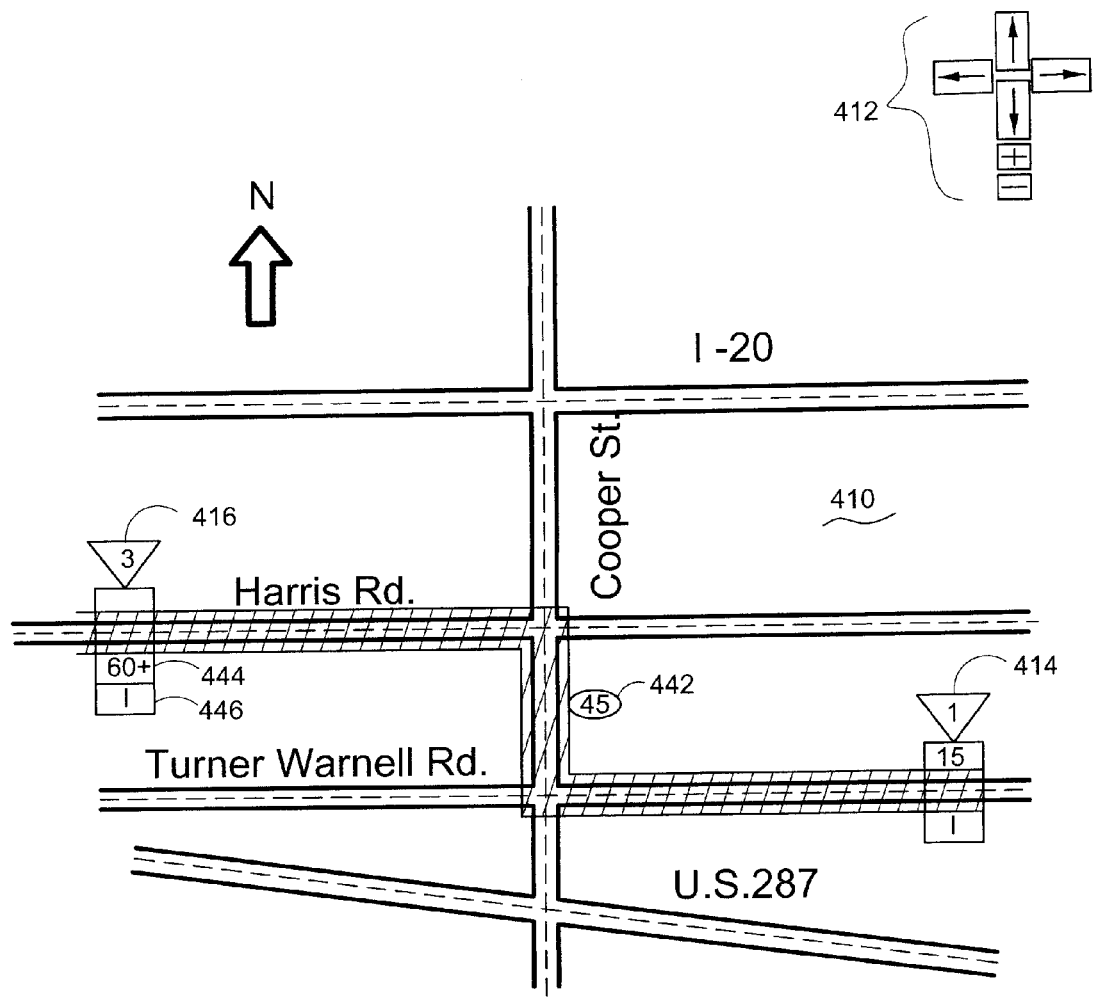
FIG. 12 diagrammatically illustrates a map having movement tracking indicia indicating a time along a location or path of the movement tracking indicia and time-based data associated with idle mode indicia.

FIG. 12 diagrammatically illustrates some additional features for the time based idle ON indicia. At map location 414 (task location 1) indicia block 440 includes indicia numeral "15" which refers to a 15 minutes idle duration. This duration is found in table 420 in FIG. 10 noting that at location 410, the task person was an idle for a 15 min. duration.

Returning to FIG. 12, in map region 442, a circle indicates numeral "45" which is a duration of the movement path from map location 414 (task location 1) to map location 416 (task location 3). Therefore, the movement indicia includes both time data and "path taken" data and distance data. Also in connection with map location 416, an expanded time based idle ON indicia is provided at block 444 showing the numeral "60+" indicating that the task person has been idle at task location 3 for 60 minutes and the idle clock is still incrementing. Of course, the task person may be providing services to a customer at location 3 which time-based services may be recoverable by an accounting program. In region 446, the "I" refers to idle. Other "clock-ON-idle" icons could be used such as a clock with a numeral showing time on site.

Figure 13:
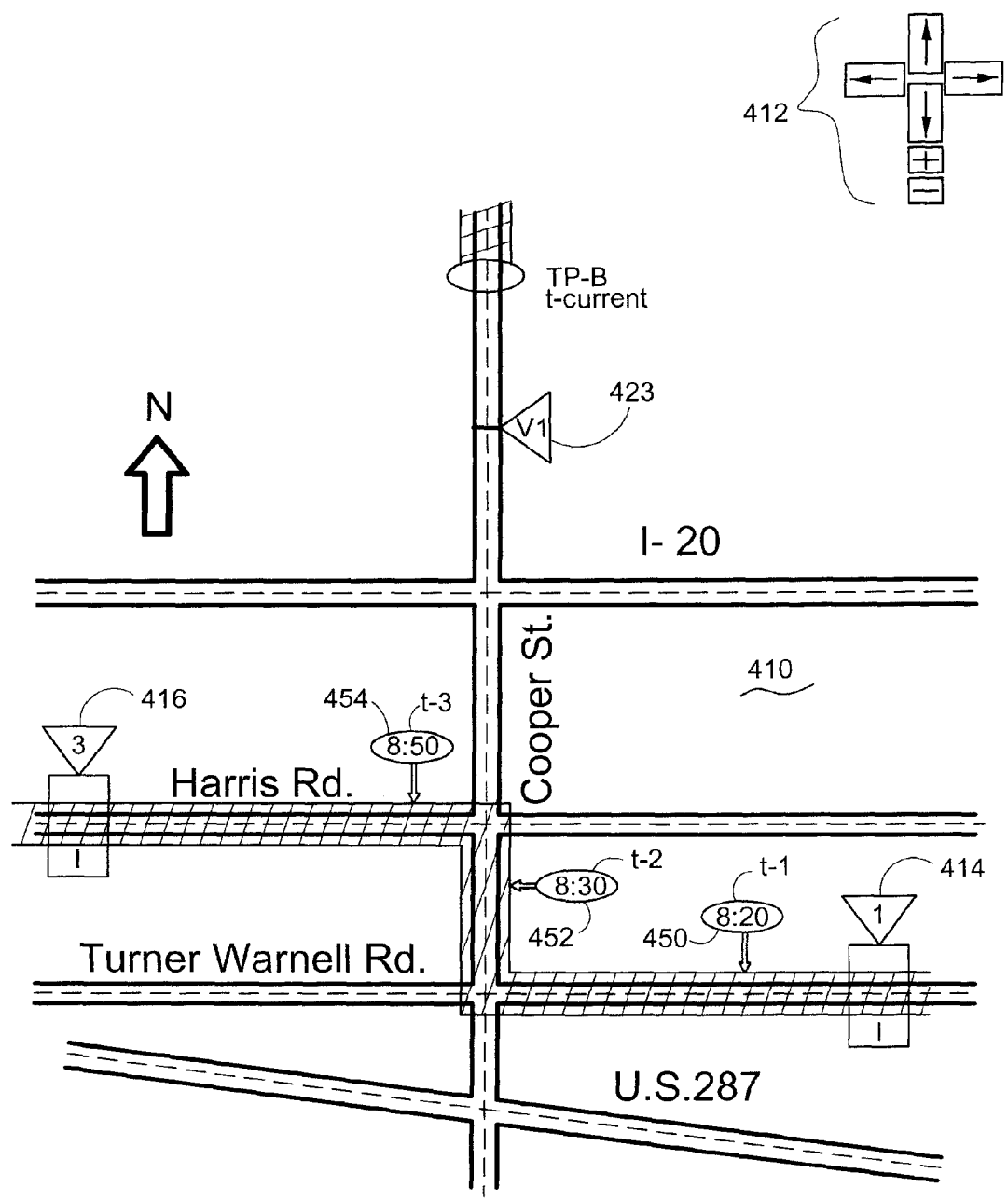
FIG. 13 diagrammatically illustrates a map wherein the time of the GPS time stamp location data is noted along a location path for the movement tracking indicia.

FIG. 13 diagrammatically illustrates that the movement indicia displayed on map 410 may be variable over the length of the path between map location 414 and map location 416. The variable data is lifted from the GPS time stamped location data. At map location 450, the arrow on the GPS path shows, as time t-1 8:20, referring to 8:20 AM for the GPS-enabled device transiting on Turner Warnell Road. At map location 452 and time t-2, the captured time is 8:30 AM. At location 454 and time t-3, the captured and recorded time is 8:50 AM. Therefore, the pathway analysis informs the system operator that the task person was seriously delayed between map point 452 to map location point 454 (a transit time of 20 minutes). Potentially, this was due to traffic or some unscheduled off-task delay. A time-based rule could trigger a comm session either in real time with a manager to at the end of the day or end of the week such that the manager could confirm the reason for the 20 minute delay. These time based comm session rules are discussed above.

Table AA below lists different indicia or icons and data which may be overlaid on the retrieved map.

TABLE AA

Details Table For Map icon pointer id
status
time, duration
distance
Task Person, GPS
Equipment
Vendor geo loc.
Customer geo loc.
Co-Worker geo loc.
Prospective Customer loc.

The map can be obtained or retrieved by the system either online (such as Google maps) or may be a stored map. Also, rather than the street map shown in the Figures herein, a satellite map may underlie the idle indicia and the movement indicia. Programs exist to integrate the GPS time stamped data onto the underlying maps. However, the overlay of idle indicia and path indicia as described herein is unique.

Figure 14A:
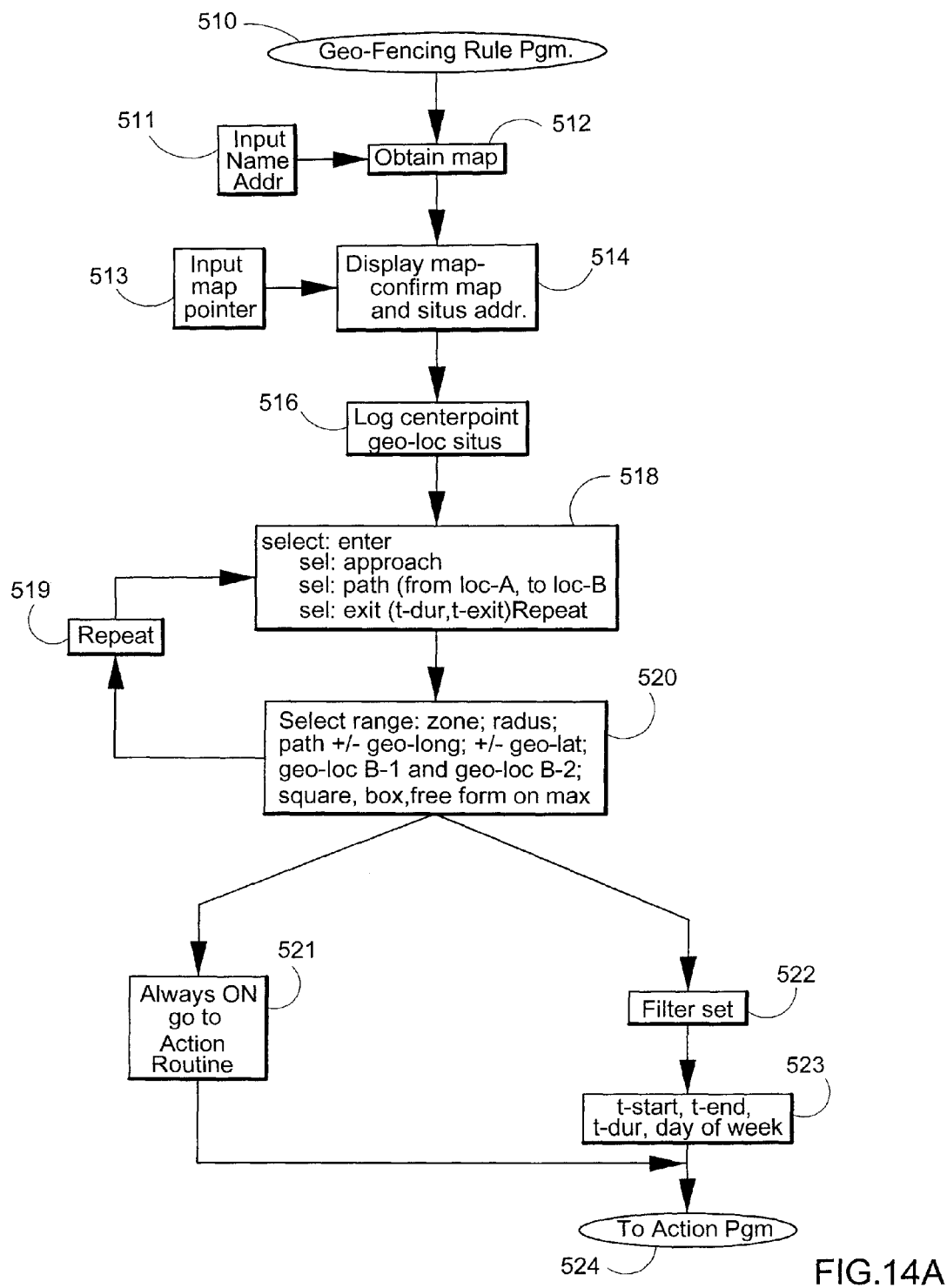
FIGS. 14A and 14B diagrammatically illustrate a geo-fencing rules program and a geo-fence action program generally describing the pre-programming of temporal rules, territorial rules and associated temporal-territorial rules.
Figure 16:
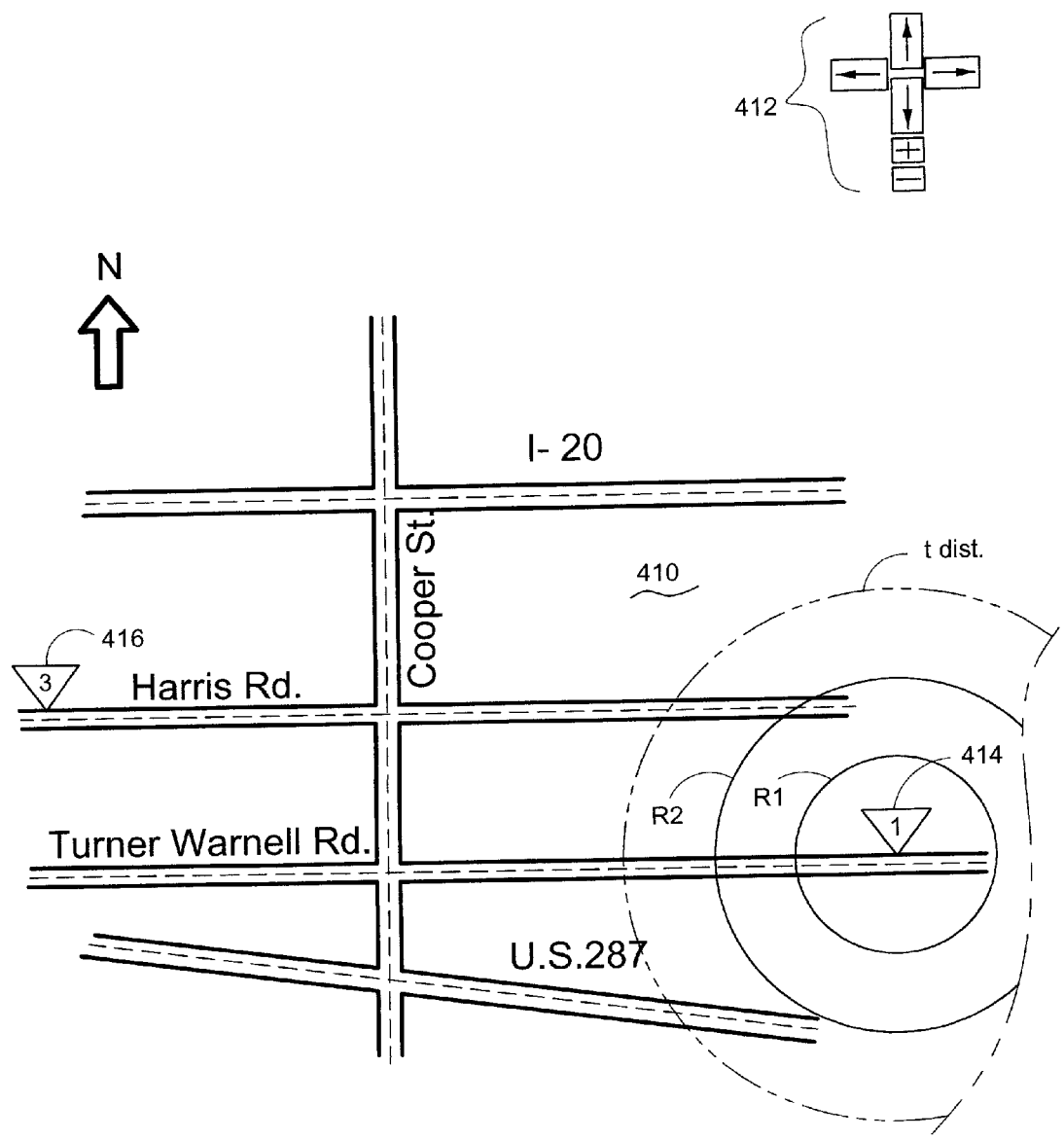
FIGS. 16, 17, 18 diagrammatically illustrate territorial rules on simple maps.

FIG. 14A diagrammatically illustrates a geo-fencing rule program which enables the system operator or user to pre-program temporal rules and associated temporal rules in the system. Rule program 510 first obtains an input from the system operator, manager or task person either as an input by name and address in step 511 or a selection of a geo-location by using a map pointer on an electronically configured map in step 513. In FIG. 16, the map pointer may be location 414 or task situs 1. If the user has input a name and address (FIG. 14A), the system in step 512 obtains a map for the user. If the user has employed a geographic pointer on a displayed map in step 513, the system after inputs 511 and 513, displays the map in step 514 and confirms the address and potentially the name of the business or owner of the property at the now-designated task situs 1, map location 414 (FIG. 16). If the user has input a name and address in step 511, the system obtains a map in 512, and displays the map in 514. Therefore, in both situations, the user confirms the geographic location with the map based upon input data from steps 511, 513.

In Step 516, the system logs in or records the geographic center point or geo-location situs of task location 1, map location 414 (FIG. 16). In step 518, the user selects a geographic setting to establish the rule. These settings may include entry, approach, path or exit. Referring concurrently to FIG. 16, the "entry" may be most immediate or very close to task situs 1, or within an error range of the geo-location of situs 1 (a match of the task person GPS enabled device and geo-location of situs 1). The entry may be tR1 in FIG. 16. A selection of "approach" may refer to a geographic territory tR2 (FIG. 16). The intermediate geographic territory is illustrated in FIG. 16 at tR2. The distal or most distant geographic territory is illustrated in FIG. 16 as t-dis. If a "path" is selected, the user is instructed to input location A (step 518, FIG. 14A), which is the task situs 1 in FIG. 16 and a second location B. This second location may refer to task location 3 at map location 416 (FIG. 16).

In step 520, the user selects the "range," as well as the "type of zone." The type of zone may be a radius, a path with an error or percentage variation, or a longitude-error and a latitude-error, or may include a path from location B1 to a second geographic location B2. The zone may be a circle or radius, a square, a box or a free form drawn on the map (FIG. 16) by the user.

Figure 17:
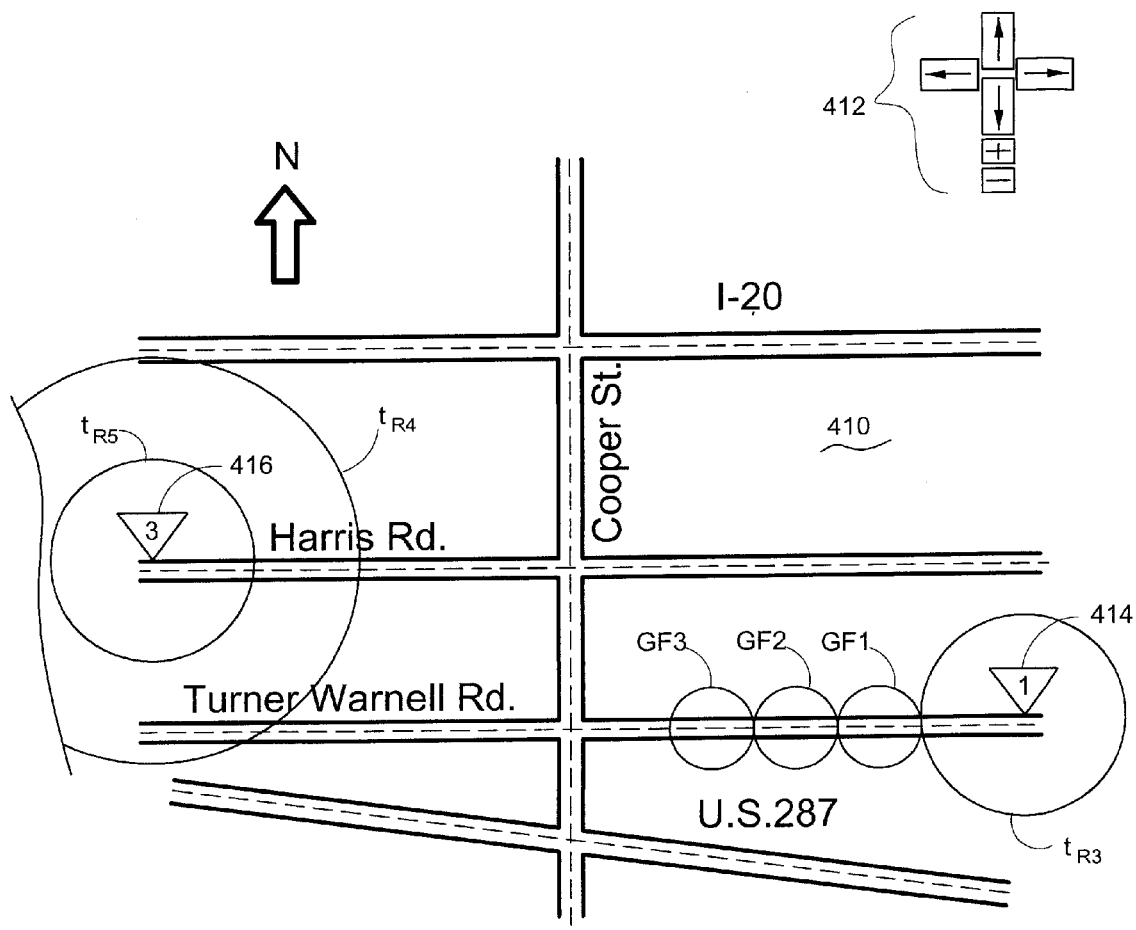
Figure 18:
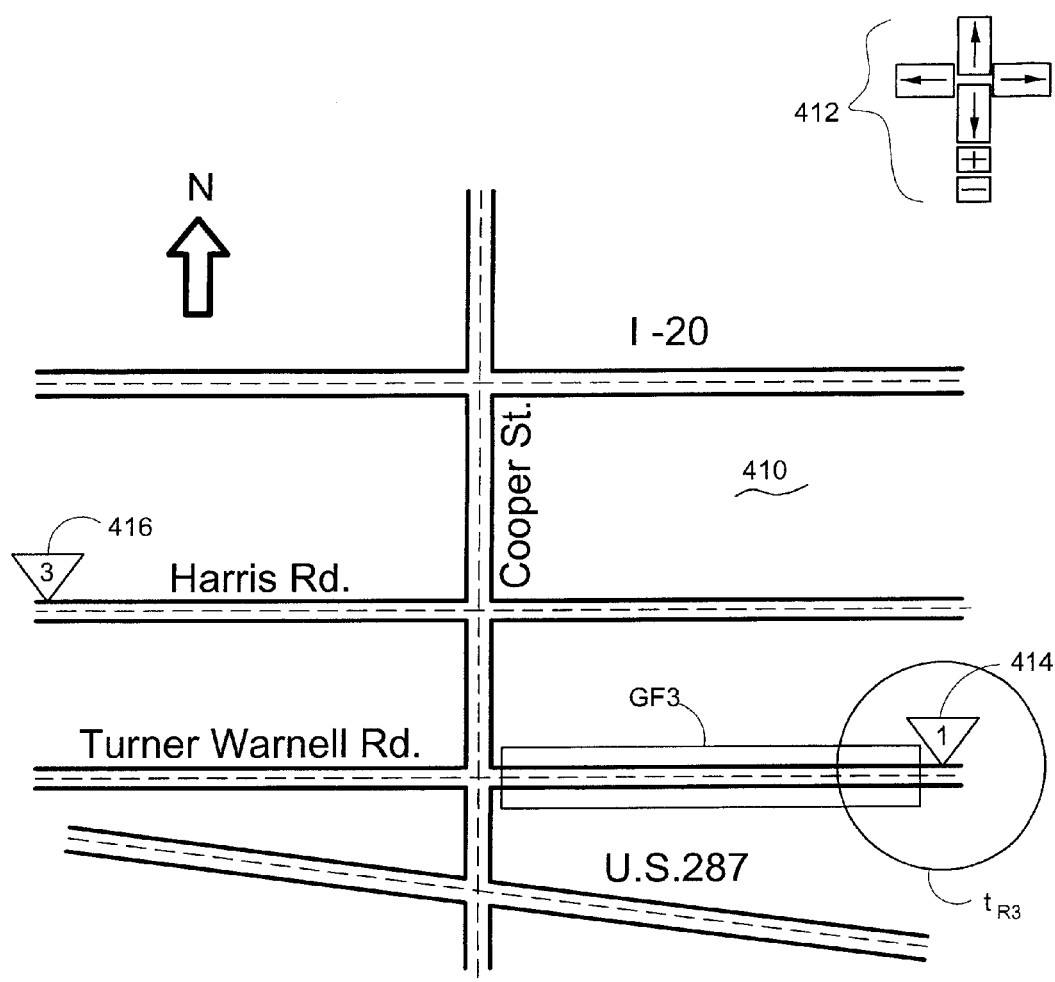

FIGS. 16, 17 and 18 diagrammatically illustrate various maps showing various zones. FIG. 16 shows generally radial zone wherein the entry may be designated as zone tR1. Since it is difficult to identify the precise center point of a task situs, a zone around the task situs is best identified. The approach may a larger geographic zone tR1. The boundary of "approach" is tR2. The largest or most distant geographic zone is graphically illustrated in FIG. 16 as t-dis. The user may "draw" the radius by first electronically pointing at map location 414 and then establishing an end point showing the radius from that path.

In FIG. 17, a series of path zones having radiuses as a moving geo fence shown as territorial circles Gf1, Gf2, Gf3. FIG. 17 shows territorial locations that are moving over certain time frame, such as when the task person TP-A is moving from location 1 to location 3. In that transit, the system has pre-programmed geographic rules or location rules such that when the task person is in the center point of geo fence circle Gf1, the territorial rule limits space at Gf1. Later, the system applies the rule to transit geographic territory Gf2 and then Gf3. With respect to location 3, an approach geographic zone tR4 and then an entry zone t-R5 is defined. If the task person should arrive at location 3 at a certain event time, then the geographic zones or territorial rules tR4 and tR5 are further tied to location 3 and the "expected arrival time" of the task person at for location 3. This is an associated temporal-territorial rule. If there is delay, the system generates a communications event (a comm notice) to the customer who may be one of the designated persons associated with the task and the task person. This is discussed earlier above.

One interesting feature of the present is that the time rules are not always associated with the location. In this manner, the "arrival time" at next location, location 3 in the present example, could be calculated based upon the task person leaving location 1 and accounting for the transit time. The territorial limits of Gf1, Gf2 and Gf3 could be used to confirm the site 3 arrival time. If a deviation from Gf1, 2, 3 is noted, the site 3 arrival time may be changed. In this manner, the time of expected arrival at location 3 is based primarily upon the time the task person leaves location 1. In this manner, the system is flexible in a time-based or temporal manner. In other words, if a customer has an emergency which is not normally scheduled, the customer could be notified of the expected arrival time of the task person at location 3 when the task person leaves location 1. This is especially true if the system has previously tracked and recorded the transit time on the path between location 1 and location 3. This is discussed above.

FIG. 18 diagrammatically illustrates another simple map wherein the geo fence Gf3 has been drawn free form by the user or the system operator from location 1. The user selects a corner point and builds the rectangle or box. Of course, location and geo fence can be established by selecting pre-programmed icons for circles, boxes, etc. and these zones or types of geographic shapes can be manipulated into larger or smaller sizes by the user. Otherwise, the user may free form draw the zone.

Returning to FIG. 14A and the geo fencing rule program 510, step 520 notes that the path may include an error plus or minus geographic longitude or an error plus or minus geographic latitude.

The system in step 519 permits the user to repeat the earlier steps if the user wants to designate multiple geographic territorial rules and time limit rules as to approach, path, exit or duration-on-site or duration-in-transit. Therefore, the system repeats step 518 and 520 until the system operator is satisfied that temporal rules are established and geographic territorial rules are establish for the particular task or task person. In this manner, the rules are preprogrammed.

After step 520, the system and the system operator determine whether the temporal and territorial rules are always ON in step 521 or whether time and day filters in step 522 are applied. If filters are applied to the temporal and territorial rules, the system in step 523 establishes a time of day "start," a time of day "end," potentially a "duration" time and a "day of week" period. For example, the territorial and temporal rules could be turned ON at 9:00 AM and be active until 5:00 PM on days Monday through Friday. Alternately, a time duration t-dur, may be set by the system operator's rules. In step 524, the system executes action program which is diagrammatically shown in FIG. 14B.

Figure 14B:
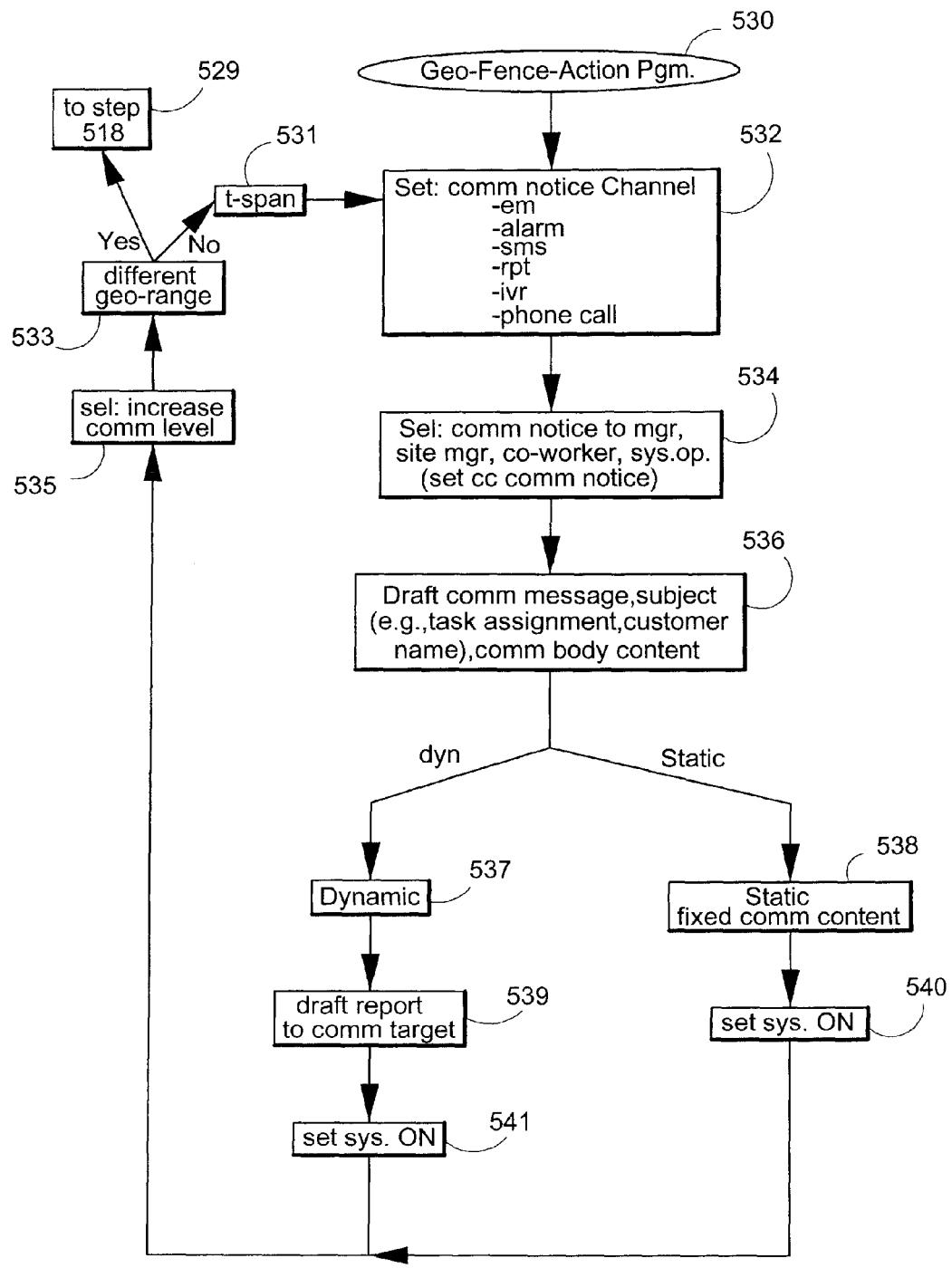

FIG. 14B diagrammatically illustrates the geo fence action program 530. In step 532, the user sets or preprograms the communications or comm notice channel. The communications channel also relates to the type of communication delivered to the task person or any other designated person included the customers and hierarchical management above the task person. These communications include email (em), a system alarm or "ping", a text message-sms, a report generated (including a form) which may be completed in real time by the designated person and then sent as a comm notice to the task person or other designated persons on the comm notice list, a cellular telephone or land line call indicating an event and generated by the system as an interactive voice response (IVR) and a land based telephone call from a person. In step 534, the user selects what communications notice goes to who, the manager, the site manager, the co-worker, or the system operator. Copies (cc) are also provided as a program option for the system. In step 536, the system operator or user preprograms a "communication message" including a subject line (for an email) such as the task assignment customer name as well as "content" in the body of the communication. In other words, an email may be sent as a comm notice and the "content body" of the email would be constant or preprogrammed in that particular comm notice.

After 536, the system branches to indicate whether a dynamic event step 537 is executed or a static event step 538 is executed. In the static event, the communications notice is a fixed comment content. For the static comm event, in step 540, the rule based system is turned ON. In dynamic path 537, the user establishes, in step 539, a form report which needs to be completed in real time or at or near the detected event, by the designated person who receives the comm notice. That designated person is the "comm target" for that communications event. In step 541, the system is turned ON.

In some situations, the system operator or user would want to increase or escalate the comm notice and notice level in step 535. This increase in comm level may be a result of a failure to respond to an earlier comm notice or may be triggered based upon the event identified by the system (an equipment fire is an event requiring more immediate, high level management interaction than some one becoming sick on the job and needing a replacement). The comm notice escalation to hierarchical managers is discussed above in connection with FIG. 9 in step 322 to 334. In step 533, a different geographic range may be selected for the increasing degree of communication. The increasing degree of communication may be an escalation from a text message comm notice to an email comm notice and then to a system alarm or ping. Also, increasing or escalating communications may escalate through hierarchical levels of management and organization. The term "designated person" includes communications to a system wide organization at an organizational level.

From step 533, the system branches to either "establish time span" step 531 for the response or returns to step 518 in jump step 529. In other words, the "time span" is the wait period for a response from the first comm notice. This is discussed above in connection with FIG. 9 and particularly the t-response time in step 328.

Figure 15:
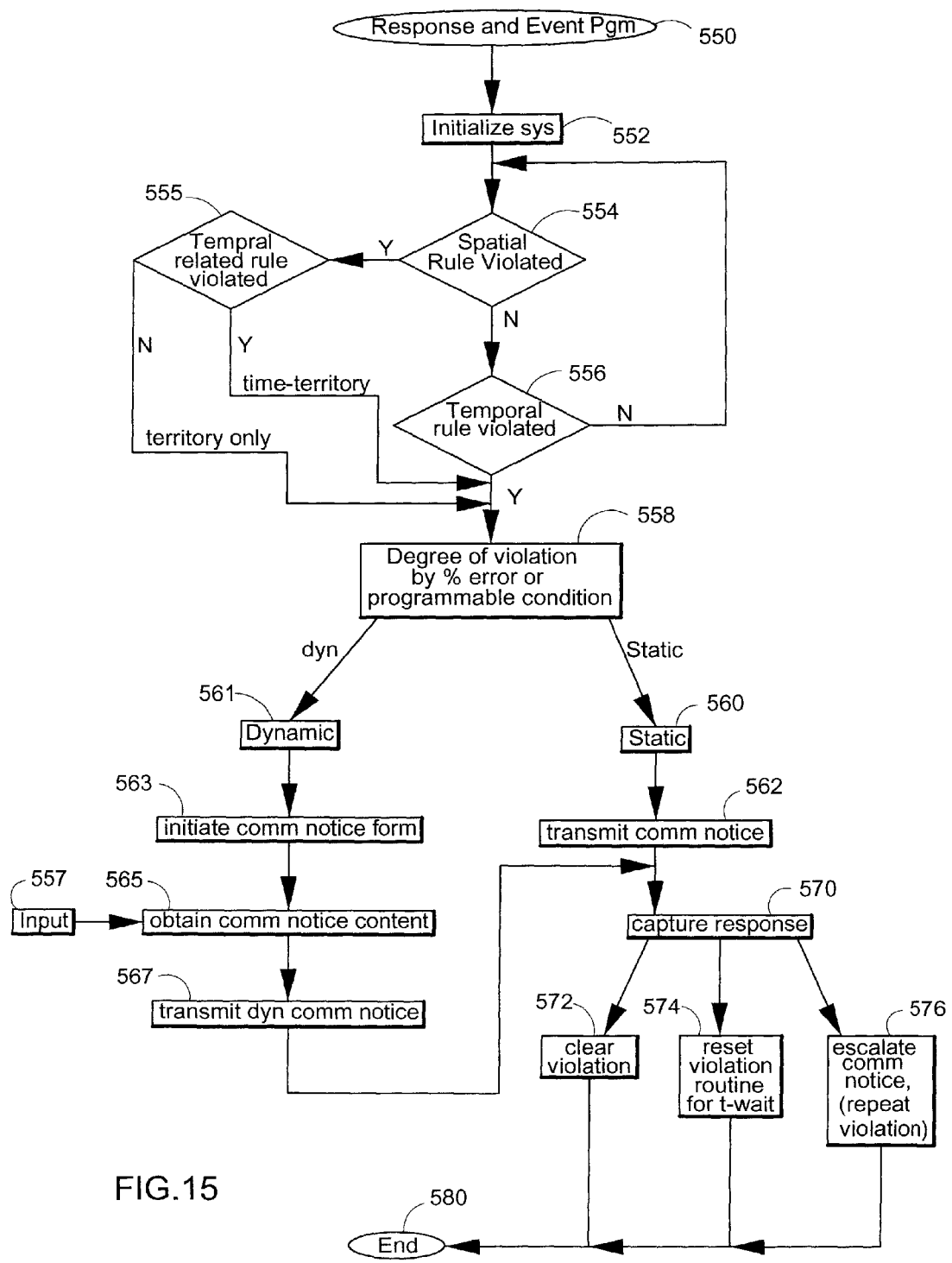
FIG. 15 diagrammatically illustrates an event response program associated with the communications events when the temporal rules are violated, the territorial rules are violated, and when the associated time and location rules are violated.

FIG. 15 diagrammatically illustrates the event and response program 550. The "event" refers to detected condition triggering a communications event. In step 552, the system is initialized and time and location based rule programs are established for temporal rules, territorial rules and the joint or associated time-and-geographic rules. Sometimes these rules are identified in connection with a particular location. At other times these rules are associated with a transit which may be triggered based upon a time of exit from a task location. In step 554, the system makes a decision whether a territorial or spatial rule has been violated. If NO, the system determines in decision step 556 whether a temporal or time based rule has been violated. Returning to decision step 554, if the spatial rule has been violated, the YES branch is taken and decision step 555 determines whether a temporal rule related to the earlier spatial rule has been violated. The resultant event from decision step 555 is either a data marker that the time and territorial rule has been violated or a data marker that only a territorial rule has been violated. In step 558, the degree of violation is noted.

A high level analysis of the present invention can refer to the degree of violation as a percentage of error or a violation of a programmable condition. For example, it may be a system wide rule that for an office worker, the office worker can move anywhere around the building as well as within one hundred yards of the front entrance of the building. As long as the office worker stays within one hundred yards of the front entrance of the building, this does not violate the territorial rule. There is no time factor in this rule. The one hundred yard rule can be expressed as a percentage error based upon the location of the front door and the size of the entire office building. In another situation, if the task situs is a residence, the territorial rule may be a fraction of a mile around the residence. This range may be expressed as a percentage of error based upon where the residence is located and the geographic radius. The best application of the percentage of error rule is in connection with a transit event wherein the task person is traveling from location to another location on a highway or a road. The error could be a certain percentage off the center line of the highway or road. As long as the task person stays within that moveable territorial block, defined by the error range, there is no violation of the rule and there is no communications event generated by the system.

From step 555, the system determines whether a static communication is present or dynamic communication is present based upon the violation determined in step 558. In static step path 560, the system in step 562 transmits the comm notice to the designated person which may be the task person or may be a supervisor or a co-worker of the task person. In step 570 the system captures a response from the designated person. In other words, a simple violation rule requires a simple communications event back from the task person. Preferably, the task person responds quickly within a certain period of time and the system resets or acts accordingly. The reset may be a privacy block. The reset may be a request for a 10 minutes time extension on a task or an indication of an equipment failure or a lack of supply. From capture response step 570, the system either clears the violation (deletes the violation) in step 572, or resets the violation routine for a "wait time" in step 574, or escalates the communication notice in step 576. An escalation notice may arise during a repeat violation detected by the system. Of course, the system log ins all violations and responses to better design the rules. Thereafter, the routine ends in step 580.

Returning to dynamic step path 561, the system in step 563 initiates a comm notice form to one or more designated persons. In step 557 the designated persons provide inputs which are used and inserted as content into the communications notice. The comm notice is dynamically created in real time byb the designated person(s). In step 565, the system obtains the newly created content for the communications notice. The content creating person may be further designated as a content provider and the newly created comm notice includes integrated real time comm data. In this sense, "real time" includes a reasonable time for the content creator to respond and input the content in to the system. In step 567, the system transmits the dynamic (dyn) communications notice to other designated person or persons. Thereafter, the system executes "capture response" step 570.

FIGS. 19A, 19B and 19C provide examples of one method to establish the time based rules and location rules. The present embodiment of the method breaks down the rule making process into event categories. Those even categories include user events, customer events, task events, work order events, device events, message events, time based events such as automated reports and reminder events. Only some information is provided in the tables of FIGS. 19A, B and C as resultant system trigger events. These are generally referred to as system result events and then as secondary system result events. Of course, there could be many resultant events (1, 2, 3, 4, events etc.) based upon the processes described earlier. Only some of the categories are explained in order to provide an example of the system and method.

Under category one, user events, the "user deleted" event requires a communications notice to a manager. The second response which may be a time event after a certain time to follow up with the task person TP manager as well as human resources response. Typically, a "user" is the task person or the business manager managing the communications system. A "user" in the sense of this Table at FIG. 19A is a person who is a task person or a manager who adds information and extracts information from the system. Users have passwords to alter system features.

With respect to category 2, customer events, the "customer deleted" event includes as a first system resultant as a communications notice to the task person TP and the TP manager.

The "report generated" may be a content request wherein the TP explains why the customer record was deleted. The same might be true regarding the TP manager. In this sense, a dynamic report is created and documented by the system. The newly created report may be uploaded to other managers as part of the comm notice system. The second system resultant event is a three month follow-up to the customer with, as an example, a targeted coupon to the lost customer. In this manner, the business could seek to reestablish the relationship with the lost customer.

Under category 3, task events, the system detected an event of "task added" and this results in a comm notice wherein the manager assigns a task person TP to the task. Further, the task person has to accept the task and the manager has to assign equipment to the task. The second system resultant event is the system checking the task person's schedule to clear any conflicts that the task person may have with respect to this new "task added" event (conflicts of time or space or territory). Further, the system checks the equipment schedule to make sure the equipment is available during that time slot for the task. This is a conflicts clearance check. A final work order is prepared and management approval is required. Thereafter, the system requests that a shift manager be assigned to the task and finally that the task be executed.

In FIG. 19B, under category 4, work order events, a system event "work order added" is noted. The same process is discussed earlier in connection with the "task added" occurs with respect to the work order added. A task may have several work orders.

With respect to FIG. 19C, category 6, device events, shows that the system has detected a "low battery level" on a GPS enabled device. A comm notice is delivered to the task person TP-A as the first system resultant comm event. If the task person does not reset the comm notice time and fix or replace the battery, the system in the second resultant event generates an email reminder to the task person.

A different view of the temporal and locations-based work rules system and method described above is to characterize the ranges for the time and spatial aspects as "error" ranges that are based, in some part, on the time or duration of time or the travel of the task person. As an example, if the task person is on-site for 3 hours, one can image that in some reasonable number of cases, the task person will be delayed 30 minutes or more. Therefore, a 30 minute "error" delay can be pre-programmed into the system. This concept of using an error routine can be carried forward as shown in the following tables.

Rules Table A: Task Situs Based Time Rules (1) At customer situs:
    set t-arrive . . . %error-1 . . . comm-level low
        . . . %err-2 . . . comm-level mid
        . . . %err-3 . . . comm-level high
    set t-duration . . . %error-1 . . . comm-level low-d
        . . . %err-2 . . . comm-level mid-d
        . . . %err-3 . . . comm-level high-d
    set t-exit . . . %error-1 . . . comm-level low-e
        . . . %err-2 . . . comm-level mid-e
        . . . %err-3 . . . comm-level high-e
(2) At prospective customer situs (pre-planned)
    set t-arrive . . . %err-1 . . . comm-level low-pb
        . . . %err-2 etc.
    set t-duration . . . %err-1 . . . comm-level low-pb-d
    etc.
    set t-exit . . . %err-1 . . . comm-level low-pb-e
    etc.
(3) At prospective customer situs (real time or less than t period)
    set t-arrive . . . %err-1 . . . etc.

-continued

Rules Table A: Task Situs Based Time Rules set t-duration . . . etc.
    set t-exit    . . . etc
(4) At Vendor - expendable supplies
    set t-arrive . . . %err-1 . . . etc.
    set t-duration . . . etc.
(5) At Vendor - durable supplies
    set t-arrive . . . %err-1 . . . etc.
    set t-duration . . . etc.
    set t-exit . . . etc The following Table shows that the error rules cna be applied to the location data.

Rules Table B: Transit, Geo-Location Centric Rules (1) Equipment (Equip A1)
    assign to task A;
    sys response: Task A assigned to T-P-a
    sys response:
        set ON match: geo-loc Equip A1 near
            geo-loc T-P-a; %err
    If NO match, then comm notice routine;
        set increasing comm notice with t-clock
(2) Transit
    set Geo-loc-start; set Geo-loc-end
    select type of geo-range (radial, box, free form)
    select $1^{st}$ geo space comm level
        %err
    select $2^{nd}$ geo space come level (%err ?)
    set transit time; set %err - comm level-a
        set %err - comm level-b In Table A and B, the three level sequence is carried forward as noted in the Table A, "At customer situs." The time of arrival is set as a projected time of arrival. If the time or location is more than, for example, 10 minutes, then a low level comm notice is sent. If the job is set to last 120 minutes, the 10 minute "error" range is less than 10% of the job task. This low level comm notice may be an SMS to the task person assigned to the job. If the detected error is 20 minutes, then the comm level is elevated. By using error ranges, a system wide time and location rule-based message and communications system can be set up. Thereafter, the sys op can reset the times to be more locally sensitive. For example, a pizza delivery in New York City may take longer during rush hour than a pizza delivery in Houston, Tex.

With respect to the error range for the location data, if a cross-state transit is being monitored, the error rate for time or geographic error may be larger than a cross-town transit. The cross-state transit may permit the task person to take a lunch break off the interstate highway. An error range system provides this feature.

Description of Typical System Features

The present invention relates to an enhanced mobile workforce planner and tracker deployed over GPS-enabled devices and enabling access to workforce data via computer systems, over the Internet and on a computer network (LAN or WAN), and computer programs, computer modules and information processing systems to accomplish these planning and tracking services.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

Abbreviations Table

| | |
|---|---|
| acct | accounting, typically an accounting function |
| Admin | Administrator |
| ap | an access point |
| API | application program interface |
| ASP | application service provider—server on a network |
| bd | board |
| bus | business |
| calc | calculate |
| cell ph | cell phone with GPS enablement |
| comm. | communications, typically telecom function, line or event |
| comp | computer with Internet access |
| comp-tbl | computer tablet with GPS and telecom link |
| CPU | central processing unit |
| db | data base, may also refer to a spreadsheet (a two-dimensional database) |
| Disp | display or code |
| doc | document |
| dr | drive, e.g., computer hard drive |
| em | email communication |
| Equip | equipment |
| ex | example, sometimes referred to as "e.g." |
| fnc | function such as V = View, ACC = Accept task; DEl = delete entry; ACK = acknowledge receipt of comm. |
| Geo | geographic location or data (geo.loc. is GPS data) |
| geo-loc | GPS location |
| geo-long | longitude |
| geo-lat | latitude |
| GF | geo-fence |
| GPS | geo positioning system and location (optionally time data) |
| HR | human resources or regional manager |
| I/O | input/output |
| Int | Internet network (part of the telecom network) |
| ivr | interactive voice response, includes voice message only cell ph |
| loc | location |
| loc. ptr. | displayed location on a displayed map |
| mem | memory |
| Mess | message as in SMS or text message |
| mgr. | manager, may be mgr in Sys Op administration or TP workforce |
| mgt | management |
| ntwk | network |
| pend | pending, such as a posted task, not yet completed |
| pgm | program |
| proc | processor, as in computer processor |
| pros | prospective, as is prospective business or customer |
| pros bus | prospective business event |
| Pty | party, as in Trusted $3^{rd}$ Party ("TTP") |
| P/W | password |
| Rcd | database record or record profile |
| re | regarding or relating to |
| Reg'd | registered as in Reg'd Pro, Registered Provider |
| rel | release |
| req | request |
| rem | reminder notice |
| rev | review |
| Rpt | Report |
| rt | real time, may include day and time stamp data |
| sec | security |
| Sel | select |
| sch | schedule |
| sm-ph | smart cellphone with GPS |
| sms | short message service or text message |
| SR | sales representative |
| sys | system |
| sys ping | a notification, audio, visual or comm event to a TP or mgr. |
| Sys Op | System Operator |
| t | time, sometimes refers to day and date and time of day |
| t-dur | a duration of time |
| t-R | time with geo-fence radius setting, t-R3 is geo-fence at t3 |
| T-person | task person who is assigned a task |
| TP-A | task person A, Task person B (TP-B) |
| Tbl | table, may be configured as a database or spreadsheet |
| telecom | telecommunications system or network |
| URL | Uniform Resource Locator, or other network locator |
| u-sel | User selects function |
| WO | work order |
| X-tbl | a selectable user function displayed beyond the grid line of the data table |

What is claimed is:

1. A computer-based method for managing a mobile workforce with task persons and converting GPS signal data from a GPS-enabled cellular phone, tablet computer or electronic device used by the task person into time-based location data, the method operative with a database populated with task situs location data, event time data and task person data representing at least contact data for that task person, said database coupled to a web-based processor which in turn is coupled to a telecommunications network, said GPS-enabled device coupled to said telecommunications network, the method comprising:

programming temporal rules unique to said task situs location;

programming territorial rules unique to said task situs location;

associating some temporal-location situs rules with some corresponding territorial-location situs rules;

generating a first communications event when the temporal-location situs rules are violated based upon data from the GPS-enabled device used by the task person;

generating a second communications event when the territorial-location situs rules are violated based upon data from the GPS-enabled device used by the task person;

generating a third communications event when the associated temporal-location-territorial-location situs rules are violated based upon data from the GPS-enabled device used by the task person;

sending the first, second and third communications events to one or more of: designated persons associated with said task person and the task person;

wherein said territorial-location situs rules unique to said task situs location include one or more rules related to a proximal territory near said location situs, an intermediate territory near said location situs which is geographically larger than said proximal territory, and a distal territory near said location situs which is geographically larger than both said proximal and said intermediate territories.

2. A computer-based method as claimed in claim 1 wherein at least one of the temporal-location rules include an event time temporal-location rule correlated to said event time data.

3. A computer-based method as claimed in claim 2 wherein at least one of the territorial-location rules include an event time territorial-location rule correlated to said event time data.

4. A computer-based method as claimed in claim 3 wherein said temporal rules unique to said task situs location include one or more rules related to an approach to said task situs location, an entry to said task situs location, an on-site correspondence with said task situs location, and a duration of time at said task situs location.

5. A computer-based method as claimed in claim 4 wherein said territorial-location situs rules unique to said task situs location include one or more rules related to a proximal territory near said location situs, an intermediate territory near said location situs which is geographically larger than said proximal territory, and a distal territory near said location situs which is geographically larger than both said proximal and said intermediate territories.

6. A computer-based method as claimed in claim 5 wherein said designated persons include superiors and co-workers of said task person.

7. A computer-based method as claimed in claim 5 wherein said designated persons are hierarchically related to each other; and said temporal-location situs rules include hierarchical temporal-location situs rules;

said territorial-location situs rules include hierarchical territorial-location situs rules; and said temporal-location-territorial-location situs rules include hierarchical temporal-location-territorial-location situs rules; and said first, second and third communications events are hierarchically sent to the hierarchically related designated persons.

8. A computer-based method as claimed in claim 7 including programming time of day ON, time of day OFF and either day of week OFF or day of week ON for the generation of first, second and third communications events.

9. A computer-based method as claimed in claim 8 wherein one or more of the first, second and third communications events include either respective preprogrammed content corresponding to the first, second and third communications in the communications events or a request to supply content responding to the first, second and third communications in the communications events.

10. A computer-based method as claimed in claim 1 wherein said temporal rules unique to said task situs location include one or more rules related to an approach to said task situs location, an entry to said task situs location, an on-site correspondence with said task situs location, and a duration of time at said task situs location.

11. A computer-based method for managing a mobile workforce with task persons and converting GPS signal data from a GPS-enabled cellular phone, tablet computer or electronic device used by the task person into time-based location data, the method operative with a database populated with task situs location data, event time data and task person data representing at least contact data for that task person, said database coupled to a web-based processor which in turn is coupled to a telecommunications network, said GPS-enabled device coupled to said telecommunications network, the method comprising:

programming temporal rules unique to said task situs location;

programming territorial rules unique to said task situs location;

associating some temporal-location situs rules with some corresponding territorial-location situs rules;

generating a first communications event when the temporal-location situs rules are violated based upon data from the GPS-enabled device used by the task person;

generating a second communications event when the territorial-location situs rules are violated based upon data from the GPS-enabled device used by the task person;

generating a third communications event when the associated temporal-location-territorial-location situs rules are violated based upon data from the GPS-enabled device used by the task person;

sending the first, second and third communications events to designated persons associated with said task person and the task person;

wherein said designated persons are hierarchically related to each other; and said temporal-location situs rules include hierarchical temporal-location situs rules;

said territorial-location situs rules include hierarchical territorial-location situs rules; and said temporal-location-territorial-location situs rules include hierarchical temporal-location-territorial-location situs rules; and said first, second and third communications events are hierarchically sent to the hierarchically related designated persons.

12. A computer-based method for managing a mobile workforce with task persons and converting GPS signal data from a GPS-enabled cellular phone, tablet computer or electronic device used by the task person into time-based location data, the method operative with a database populated with task situs location data, event time data and task person data representing at least contact data for that task person, said database coupled to a web-based processor which in turn is coupled to a telecommunications network, said GPS-enabled device coupled to said telecommunications network, the method comprising:

programming temporal rules unique to said task situs location;

programming territorial rules unique to said task situs location;

associating some temporal-location situs rules with some corresponding territorial-location situs rules;

generating a first communications event when the temporal-location situs rules are violated based upon data from the GPS-enabled device used by the task person;

generating a second communications event when the territorial-location situs rules are violated based upon data from the GPS-enabled device used by the task person;

generating a third communications event when the associated temporal-location-territorial-location situs rules are violated based upon data from the GPS-enabled device used by the task person;

sending the first, second and third communications events to one or more of: designated persons associated with said task person and the task person;

wherein one or more of the first, second and third communications events delivered to either the designated person or the task person include either (a) respective pre-programmed content corresponding to the first, second and third communications events or (b) a request to supply content responding to the first, second and third communications events.

13. A computer readable medium having stored therein non-transient computer program for managing a mobile workforce with task persons and converting GPS signal data from a GPS-enabled cellular phone, tablet computer or electronic device used by the task person into time-based location data, the method operative with a database populated with task situs location data, event time data and task person data representing at least contact data for that task person, said database coupled to a web-based processor which in turn is coupled to a telecommunications network, said GPS-enabled device coupled to said telecommunications network, the method comprising:

programming temporal rules unique to said task situs location;

programming territorial rules unique to said task situs location;

associating some temporal-location situs rules with some corresponding territorial-location situs rules;

generating a first communications event when the temporal-location situs rules are violated based upon data from the GPS-enabled device used by the task person;

generating a second communications event when the territorial-location situs rules are violated based upon data from the GPS-enabled device used by the task person;

generating a third communications event when the associated temporal-location-territorial-location situs rules are violated based upon data from the GPS-enabled device used by the task person; and sending the first, second and third communications events to one or more of: designated persons associated with said task person and the task person;

wherein said territorial-location situs rules unique to said task situs location include one or more rules related to a proximal territory near said location situs, an intermediate territory near said location situs which is geographically larger than said proximal territory, and a distal territory near said location situs which is geographically larger than both said proximal and said intermediate territories.

14. A computer readable medium having stored therein non-transient computer program as claimed in claim 13 wherein at least one of the temporal-location rules include an event time temporal-location rule correlated to said event time data.

15. A computer readable medium having stored therein non-transient computer program as claimed in claim 14 wherein at least one of the territorial-location rules include an event time territorial-location rule correlated to said event time data.

16. A computer readable medium having stored therein non-transient computer program as claimed in claim 15 wherein said temporal rules unique to said task situs location include one or more rules related to an approach to said task situs location, an entry to said task situs location, an on-site correspondence with said task situs location, and a duration of time at said task situs location.

17. A computer readable medium having stored therein non-transient computer program as claimed in claim 16 wherein said territorial-location situs rules unique to said task situs location include one or more rules related to a proximal territory near said location situs, an intermediate territory near said location situs which is geographically larger than said proximal territory, and a distal territory near said location situs which is geographically larger than both said proximal and said intermediate territories.

18. A computer readable medium having stored therein non-transient computer program as claimed in claim 17 wherein said designated persons are hierarchically related to each other; and said temporal-location situs rules include hierarchical temporal-location situs rules;

said territorial-location situs rules include hierarchical territorial-location situs rules; and said temporal-location-territorial-location situs rules include hierarchical temporal-location-territorial-location situs rules; and said first, second and third communications events are hierarchically sent to the hierarchically related designated persons.

19. A computer readable medium having stored therein non-transient computer program as claimed in claim 13 wherein said temporal rules unique to said task situs location include one or more rules related to an approach to said task situs location, an entry to said task situs location, an on-site correspondence with said task situs location, and a duration of time at said task situs location.

20. A computer readable medium having stored therein non-transient computer program as claimed in claim 13 wherein said designated persons are hierarchically related to each other; and said temporal-location situs rules include hierarchical temporal-location situs rules;

said territorial-location situs rules include hierarchical territorial-location situs rules; and said temporal-location-territorial-location situs rules include hierarchical temporal-location-territorial-location situs rules; and said first, second and third communications events are hierarchically sent to the hierarchically related designated persons.

21. A computer readable medium having stored therein non-transient computer program as claimed in claim 13 wherein one or more of the first, second and third communications events include either respective preprogrammed content corresponding to the first, second and third communications in the communications events or a request to supply content in the corresponding to the first, second and third communications in the communications events.

* * * * *